United States Patent [19]

Ingwersen

[11] 3,748,451

[45] July 24, 1973

[54] GENERAL PURPOSE MATRIX PROCESSOR WITH CONVOLUTION CAPABILITIES

[75] Inventor: Larry D. Ingwersen, Blaine, Minn.

[73] Assignee: Control Data Corporation, Minneapolis, Minn.

[22] Filed: Aug. 21, 1970

[21] Appl. No.: 65,916

[52] U.S. Cl. .............................. 235/156, 340/172.5

[51] Int. Cl. .............................. G06f 7/38

[58] Field of Search .................... 235/156, 159, 160, 235/164, 181; 444/1; 340/172.5

[56] References Cited

UNITED STATES PATENTS

| | | | |
|---|---|---|---|
| 3,500,027 | 3/1970 | Wyle | 235/156 |
| 3,532,867 | 10/1970 | Ricketts, Jr. et al | 235/181 |
| 3,449,553 | 6/1969 | Swan | 235/156 X |
| 3,517,173 | 6/1970 | Gilmartin | 235/156 |
| 3,553,722 | 1/1971 | Ott | 235/156 |

OTHER PUBLICATIONS

I. Flores "Computer Software; Programming Systems for Digital Computers," May 1966, pp. 454–455.

R. Shirely, "A Digital Processor to Generata Spectra in Real Time," IEEE Trans. on Computers May, 1968, pp. 485–491.

*Primary Examiner*—Eugene G. Botz
*Assistant Examiner*—David H. Malzahn
*Attorney*—Paul L. Sjoquist

[57] ABSTRACT

Method and apparatus of computing a generalized convolution of values from two matrices of complex values $A_0$ through $A_m$ and $B_0$ through $B_n$ respectively. The formula used in the computation of each complex vector element $C_k$ of the generalized convolution is $$\overline{C}_k = \sum_{j=0}^{LC-1} \overline{A}_{PJ+Qk+R} \cdot \overline{B}_{Uj+Vk+W},\ 0 \leq k < PC$$

where P and U specify the increment for each succeeding element involved in a single convolution from each sequence respectively, Q and V specify the increments between first elements of successive convolution coefficients, in each sequence, respectively, and R and W specify the first pair of elements used in forming $C_0$. PC specifies the number of $C_k$'s to be computed. This computation has wide applicability to such allied mathematical operations as vector and matrix algebra, linear programming and a wide variety of transformation weighting and skirting operations such as Bessel function weighting, Hanning windows, complex Kernal transformations, and fast Fourier transforms. In addition, the apparatus described has capability to compute various special cases of the generalized equation involving vectors of real values only.

21 Claims, 12 Drawing Figures

United States Patent [19] [11] 3,748,451
Ingwersen [45] July 24, 1973
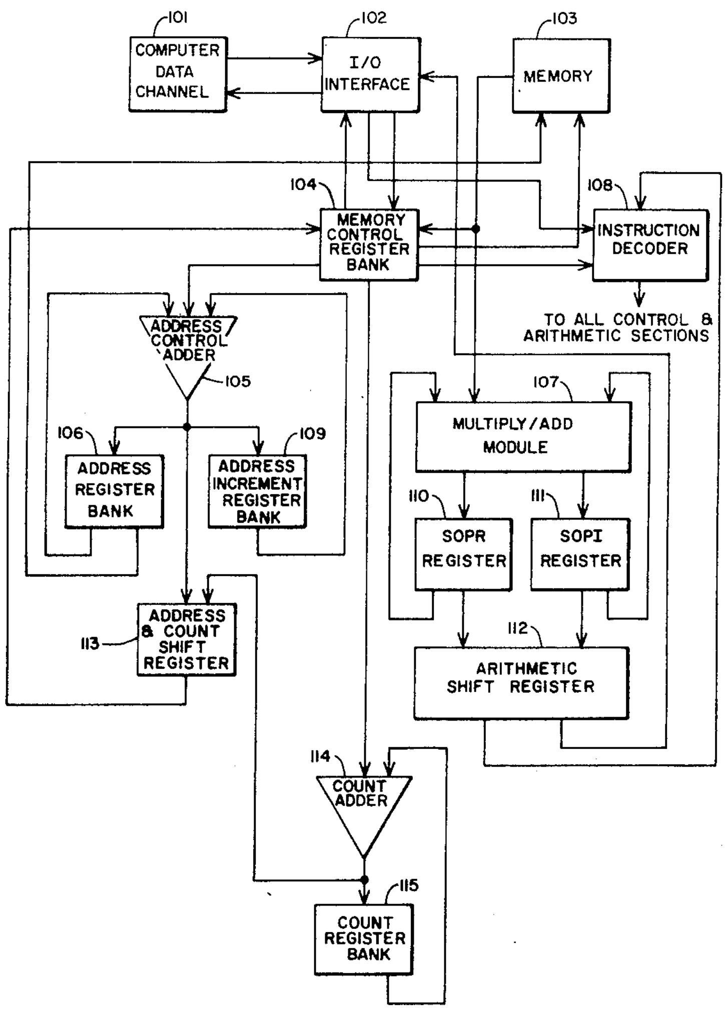

INVENTOR
LARRY D. INGWERSEN
BY Paul L. Sjoquist
ATTORNEY

INVENTOR.
LARRY D. INGWERSEN
BY Paul L. Sjoquist
ATTORNEY

INVENTOR.
LARRY D. INGWERSEN
BY Paul L. Sjoquist
ATTORNEY

INVENTOR.
LARRY D. INGWERSEN
BY Paul L. Sjoquist
ATTORNEY

INVENTOR
LARRY D. INGWERSEN
BY Paul L. Sjoquist
ATTORNEY

INVENTOR
LARRY D. INGWERSEN
BY Paul L. Sjoquist
ATTORNEY

INVENTOR.
LARRY D. INGWERSEN
BY Paul L. Sjoquist
ATTORNEY

INVENTOR
LARRY D. INGWERSEN
BY Paul L. Sjoquist
ATTORNEY

PATENTED JUL 24 1973 3,748,451

SHEET 09 OF 10

INVENTOR
LARRY D. INGWERSEN
BY Paul L. Sjoquist
ATTORNEY

INVENTOR.
LARRY D. INGWERSEN
BY Paul L. Sjoquist
ATTORNEY

GENERAL PURPOSE MATRIX PROCESSOR WITH CONVOLUTION CAPABILITIES

BACKGROUND OF THE INVENTION

The digital computer is admirably suited for matrix operations of all kinds. The manipulations invariably follow well defined rules with relatively few exceptions involved. This was recognized very early in the history of high-speed computers. As the digital computer gained more flexibility, implementation of such low grade matrix operations consumed relatively large amounts of high grade computer time. Thus, special purpose computers have been and are being developed for matrix operations. These matrix operations range from the classical matrix additions, multiplications, and inversions to the later matrix manipulations of linear programming solutions. Recently, in transformation weighting and skirting operations, matrix operations quite different from the classical have been devised. Examples are Bessel function weighting, Hanning windows, complex Kernal transformations, and fast Fourier transforms.

As an example, consider the mathematics involved in digital signal processing. The applications vary from the processing of radar "blips" in determining the shape of approaching objects to the processing of seismic reflections to get a picture of underground structures. To format the data for digital processing, it is sampled at intervals using analog to digital electronic techniques. The basic operations to be performed on this time series data are noise filtering and correlation. Correlation techniques can be used to evaluate the final (noise-free) array or filter the noise.

Filtering and correlation can be done in a variety of ways. There are two common approaches:

a. Time Domain — The time domain trace is convolved with a time domain filter or correlation pattern.

b. Frequency Domain — The time domain trace is moved to the frequency domain by Fourier transformation, the filter is a weighting operation, and the filtered data is moved back to the time domain by an inverse Fourier transform.

The first generation of algorithm modules were convolvers. Convolvers solve the problem via time domain techniques.

In 1965, Cooley and Tukey reported discovery of an algorithm which allowed high speed calculation of Fourier Transforms. This algorithm has become known as the Fast Fourier Transform (FFT). The FFT and Inverse FFT make the frequency domain method speed competitive with convolution. A new generation of signal processing peripherals began to appear on the scene. These devices have the FFT algorithm as well as convolution wired into their hardware. (See What is the Fast Fourier Transform?; W.T. Cochran, et al; IEEE Transactions on Audio and Electroacoustics; Volume AU-15, No.2, June 1967.)

The older, discrete Fourier transform (DFT) which the FFT algorithm solves is:

$$\overline{A}_k = \sum_{j=0}^{N-1} \overline{X}_i \cdot \overline{H}(j, k)$$

where $\overline{A}_k = k^{th}$ element of the Fourier transform (the bar over any symbol implies it to be a complex value, i.e. $\overline{A}_k = a_k + i\,\alpha_k$)

$\overline{X}_j = j^{th}$ element of the series to be transformed $N$ = total number of samples in the series and must be a power of 2 for FFT solution $k = 0, 1, 2, \cdots N-1$ $j = 0, 1, 2, \cdots N-1$ $\overline{H}(j,k) = e^{-i\theta}$ where $\theta = 2\pi jk/N$ $i = \sqrt{-1}$ The FFT algorithm uses the rectangular form of the exponential term (i.e., $e^{i\theta} = \cos\theta + i\sin\theta$, $e^{-i\theta} = \cos\theta - i\sin\theta$). For the decimation-in-frequency method (see Cochran, supra), the series of N values is divided into two series having N/2 values each. The first series consists of the first N/2 values and the second series consists of the last N/2 values.

Even-numbered transform position values can be computed as an N/2 value DFT of a simple combination of the first N/2 and the last N/2 values. Odd-numbered transform position values can be computed as another N/2 value DFT of a different simple combination of the first and last N/2 values. This method requires $N/2 \log_2 N$ complex additions, complex subtractions, and complex multiplications.

Indexing of operands and rotational values varies with series length and level (n levels, A, B, C, ···). Each level has twice the number of series as the previous level, each series being half as long as before. FIG. 10 is a signal flow chart which illustrates the sequence of the algorithm for the case where $N=8$ ($2^n = N$, $n = 3$). In FIG. 10, level A has a single series of eight values, level B has two series of four values each, and level C has four series of two values each. The computation results from level C make up each $\overline{A}_k$. The basic cycle is to pick pairs of complex values according to a selection algorithm, form the sum of each pair, multiply the difference of each pair by a rotational value, and restore the results in the same memory locations from which the operands were taken — destroying the previous results. This procedure continues until a single sample value constitutes its own series.

Rotational values are determined as follows:

$$\theta_{n,r} = -2\pi r/N$$

where $N$ = the series length in level $n$ $r = 0, 1, 2, \cdots N/2 - 1$

In FIG. 10, level $A$, N = 8 and:

$\theta_{A,0} = -(0)\ 2/8\ \pi = 0°$ $\theta_{A,1} = -(1)\ 2/8\ \pi = -45°$ $\theta_{A,2} = -(2)\ 2/8\ \pi = -90°$ $\theta_{A,3} = -(3)\ 2/8\ \pi = -135°$ For level B, $N=4$ for each series of samples:

$\theta_{B,0} = -(0)\ 2/4\ \pi = 0°$ $\theta_{B,1} = -(1)\ 2/4\ \pi = 90°$

For level C, $N = 2$ for each series of samples:

$\theta_{C,0} = -(0)\ 2/2\ \pi = 0°$

The selection algorithm in each case starts with dividing the points into a first and second series containing equal numbers of values. Pairs are selected from adjoining series, the values in each occupying corresponding positions in each series. The sums replace the values of the first series and the difference/products replace the values of the second. This procedure continues with a second iteration where the first and second series are each treated as a complete, self-contained series and are each divided into a first and second series and treated as above. This operation continues until each series is composed of one point only.

After the transforming sequence, the final results from level $n$ (C in the example) require re-ordering to get them in the same sequence as the input series. The algorithm accomplishes re-ordering by bit reversal of the position bits expressed in octal. Thus, position 001 in FIG. 10 contains coefficient $100_2$, $011_2$ coefficient $110_2$, etc.

The FFT Algorithm has the following characteristics:

a. It has many iterations of the equation $(\vec{F}_n+\vec{F}_m)\vec{W}(n,r)$ b. The phasing angles are evenly spaced by degree. The subscripts $m$ and $n$ are equidistant.

d. The $\vec{F}$ operands are equidistant.

e. Between levels, the indexes are halved or doubled.

A complex weighting operation can be performed prior to or following a transform operation. The weighting operation is of the form:

$\overline{G}_n\overline{W}_x = (a+ib)_p\ (c+id)_p = (ac-bd+i(ad+bc))_p$ where $(a+ib)_p = p^{th}$ complex operand, $(c+id)_p = p^{th}$ complex weighting value, and $i = \sqrt{-1}$ One iteration through the weighting operation consists of multiplying the $p^{th}$ complex weighting value and storing the result $[ac - bd + i\ (ad + bc)]_p$.

Weighting has the following characteristics:

a. It has many iterations of the equation $\overline{G}_n\overline{W}_x$.

b. The $\overline{W}_x$ are equispaced.

c. The $\overline{G}$ operands are equispaced.

Another group of methods now being used in digital processing of radar traces (which includes the Hanning window) places skirts on the frequency domain magnitude spectrum. Here the $k^{th}$ frequency $(\overline{A}_k)$ is given added magnitude $(\Delta\overline{A}_k)$ depending on the frequencies $(\overline{A}_{k-1}, \overline{A}_{k-2}$, etc. and $\overline{A}_{k+1}, \overline{A}_{k+2}$, etc.) on either side.

This skirting has the following characteristics:

a. It has many iterations of equations of the type $\overline{A}_k + \Delta\overline{A}_k = \overline{W}_1\overline{A}_{k-2} + \overline{W}_2\overline{A}_{k-1} + \overline{W}_3\overline{A}_k + \overline{W}_4\overline{A}_{k+1} + \overline{W}_5\overline{A}_{k+2}$ b. The $\overline{W}$ values are equispaced.

c. The $\overline{A}$ operands are equispaced.

d. Each iteration overlaps the last.

Characteristics $a$, $b$, and $c$, of each of the three described algorithms are similar. I have examined several other algorithms used in signal processing and matrix manipulation having these three characteristics in common. They are:

1. Sum of squares
2. Real convolution
3. Correlation
4. Vector addition
5. Recursive filtering
6. Real and complex vector dot product
7. Scalar matrix multiplication
8. Scalar matrix add
9. Matrix by matrix multiplication
10. Linear programming solutions
11. Numerical analysis, including Runga-Kutta and Gauss-Seidel algorithms.

Special purpose apparatus operating according to an algorithm having the common characteristics of all these algorithms and sufficient flexibility to accommodate the individual variations could comprise a general purpose matrix algorithm processor (MAP). With proper design of the MAP and its algorithm, it should be very little more expensive than a special purpose device for calculating, say the FFT. Yet it could be as fast, or nearly so, as a special purpose device and have much wider application in digital processing.

BRIEF DESCRIPTION OF THE INVENTION

Simply stated, my invention teaches an apparatus and method having the iterative and the equally spaced operand selection capabilities along with the requisite flexibility necessary to compute all the previously listed operations. Flexibility is such that related operations in these areas yet to be devised should be easily implemented by my apparatus and method. The most general form of my invention teaches the calculation of this set of equations:

$$\vec{C}_k = \sum_{j=0}^{LC-1} \vec{A}_{Pj+Qk+R} \cdot \vec{B}_{Uj+Vk+W} \quad \text{(i)}$$

$k$ is varied from 0 through PC, an integer pass count. Thus there will be $PC+1$ $\vec{C}_k$'s. For each $\vec{C}_k$ the specified summation with $k$ involved in the $\vec{A}$ and $\vec{B}$ subscripts is used. $P$, $Q$, $R$, $U$, $V$, and $W$, are all integer constants which must be selected according to the problem solution desired. The notation $P_j+Qk+R$ means multiplication of $P$ by $j$ and addition of $Q$ times $k$ and $R$ to this product to determine the subscript of the complex value of $\vec{A}$. This subscript specifies the position of an element $\vec{A}_m$ in a vector composed of a plurality of complex elements, this vector being generally referred to as the A vector. Similar statements can be made for the $\vec{B}_{Uj+Vk+W}$ term which is one element of a B vector. Calculation of the specified $\vec{C}_k$'s will be referred to as a generalized complex convolution (GCC) by analogy to the real convolution.

Letting $\vec{A}_j = a_j + i\alpha_j$ and $\vec{B}_j = b_j+i\beta_j$, equations (i) can be expanded to $$\overline{C}_k = \sum_{j=0}^{LC-1} a_{Pj+Qk+R} \cdot b_{Uj+Vk+W} - \sum_{j=0}^{LC-1} \alpha_{Pj+Qk+R} \cdot \beta_{Uj+Vk+W} + i\left[\sum_{j=0}^{LC-1} \alpha_{Pj+Qk+R} \cdot b_{Uj+Vk+W} + \sum_{j=0}^{LC-1} a_{Pj+Qk+R} \cdot \beta_{Uj+Vk+W}\right] \quad \text{(ii)}$$

where $i = \sqrt{-1}$

This follows from the fact that $\overline{A}_j \cdot \overline{B}_j = (a_j+i\alpha_j)(b_j+i\beta_j) = a_jb_j-\alpha_j\beta_j + i\ (\alpha_jb_j+a_j\beta_j)$. Equations (ii) is the form which is computed by the apparatus.

Equations (ii) immediately suggest a very useful but less general set of equations of the same form involving only real values:

$$C_k = \sum_{j=0}^{LC-1} a_{Pj+Qk+R} \cdot b_{Uj+Vk+W} \quad \text{(iii)}$$

The operation of computing these equations will be referred to as a generalized real convolution (GRC). In this case, the $A$ and $B$ vectors comprise real values only. This capability can be added very inexpensively, since equation (iii) forms one summation of equation (ii). Computation and use of equation (iii) and apparatus implementing it are described by myself in A Philosophy for Digital Signal Processors; Ingwersen, L.D.; Software Age; Aug. 1969.

Equation (i) can be further varied to $$\bar{C}_k = \sum_{j=0}^{LC-1} \bar{A}_{Pj+Qk} \cdot \bar{B}_{Uj+Vk} \qquad \text{(iv)}$$

This equation, while more general in a patent sense, is somewhat less useful in a mathematical sense, since $\bar{C}_0$ must involve $\bar{A}_0 \cdot \bar{B}_0$. But when dealing with coefficients stored in addressable memory registers, equation (iv) is essentially identical to equation (i) since the A and B vector memory areas can be redefined address-wise to specify different terms as $\bar{A}_0$ and $\bar{B}_0$ and every other $\bar{A}$ and $\bar{B}$. The new $\bar{A}_0$ and $\bar{B}_0$ will then be, e.g. simply $\bar{A}_R$ and $\bar{B}_W$ in the old vectors.

The apparatus which performs these computations is referred to as a matrix algorithms processor (MAP). It operates as new peripheral device of a general purpose digital computer. It communicates with a general purpose computer via an input-output (I/O) channel which exchanges data with the MAP and transmits control signals to the MAP. Since the MAP is a high-speed digital processor, it is necessary that it have a self-modifying instruction capability. Accordingly rudimentary load, store, shift, and decision making instructions are provided. These modify the matrix processing operation and adapt it to the calculation of the desired algorithm from those previously mentioned.

The method involves the act of programming the MAP to provide solutions to these algorithms. This involves presetting, with certain housekeeping instructions, the parameters of the GCC or the GRC to perform the computation. Then the computation itself must be executed and the solutions properly stored. For many of these algorithms, a multi-step operation must be performed, involving change of the parameters after a portion of the processing has been completed. Although the algorithms involved are by no means trivial exercises in mathematics, those skilled in the programming of digital computers and familiar with the processing required by these algorithms will have no difficulty in programming the MAP to solve the desired equations.

Accordingly, it is one object of this invention to provide apparatus for high-speed calculation of the previously specified vector equations.

Another object of the invention is to provide the capability of efficiently solving yet-to-be-discovered matrix equations.

A third object of the invention is to provide a high-speed peripheral matrix processor for a general purpose computer.

A further object is to provide such a peripheral processor utilizing a relatively small amount of general purpose digital computer time in providing this capability.

Still another object of this invention is to provide this matrix processor at a cost very little more than that of apparatus providing capabilities for solving only one of the specified algorithms.

Other objects of the invention will become apparent to the reader upon understanding the detailed description of the embodiment.

DETAILED DESCRIPTION OF THE EMBODIMENT

Figure 1:
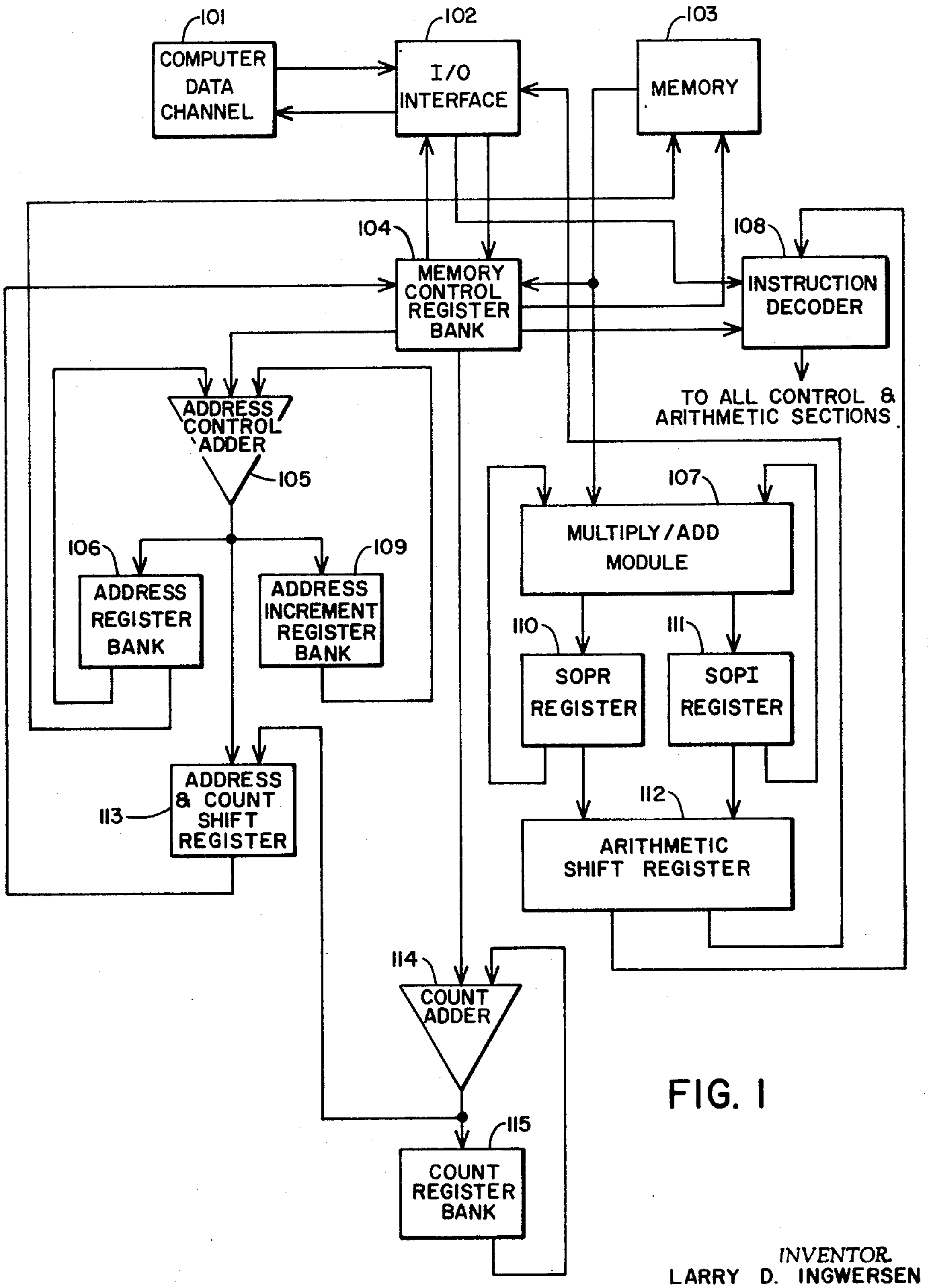
FIG. 1 is a generalized block diagram of the MAP.

Referring first to FIG. 1, the MAP communicates with a computer data channel 101 through the I/O interface 102 of the MAP. Data received from the computer data channel 101 is transmitted to the memory control register bank 104. It is then transmitted by the appropriate registers within the memory control register bank to the memory 103. The memory 103 may have addressable data cells, in which case the computer data channel 101 may specify the address area in which the data is stored. Data transfer to the computer data channel 101 is essentially the inverse of the above. Data is transmitted to the memory control register bank 104 from the memory 103 in response to a command from the computer data channel 101. The data then passes through the I/O interface 102 and is accepted by the computer data channel 101. The memory 103 is divided into sections or banks. Within these banks the memory holds two matrices or vectors, each originally being received via computer data channel 101 and located conveniently, even perhaps overlapping. These will be referred to as A and B matrices. Thus Ao is the first element of the A matrix. The desired operation is performed on these two matrices and the coefficients of the resulting matrix are stored in a third or C area of memory 103 as desired, again possibly overlapping the A and B areas. A fourth area of memory 103 is devoted to the storage of instructions which specify the arithmetic and control operations to be performed.

Instruction decoder 108 receives instructions from memory 103 via memory control register bank 104 when in memory instruction mode. The memory control register bank 104 selects the instructions in the proper order and supplies them to instruction decoder 108. Each instruction is decoded and the instruction decoder 108 issues control pulses to all control and arithmetic sections causing them to perform processing required to execute the instruction. Instructions may also be received directly from the computer via computer data channel 101 and executed in the order supplied when in data channel instruction mode.

The multiply-add module receives coefficients of the matrices from memory 103 for arithmetic processing. The multiply-add module 107 performs the multiplications and additions specified by the parameters of the arithmetic instruction and the preset parameters. In the most general operation, a single arithmetic instruction causes multiply-add module 107 to receive one complex number from each matrix in response to a retrieve signal from instruction decoder 108. The real coefficients are multiplied and added to the SOPR register 110. The two imaginary coefficients are multiplied together and subtracted from the SOPR register 110. The real coefficient of the term from the A matrix is multiplied by the imaginary coefficient of the B matrix and added to the SOPI register 111. The imaginary coefficient of the term from the A matrix is multiplied by the real coefficient from the B matrix and added to the SOPI register 111. This series of multiplication and addition operations is continued for the succeeding terms from each matrix received from memory 103 locations specified by address register bank 106. The number of terms taken from each matrix to form one sum of products is specified by a previously executed control instruction. When the specified number of terms have been multiply-added into the sums of products, the contents of the SOPR register 110 is transmitted to the arithmetic shift register 112. The arithmetic shift register 112 shifts the contents of SOPR register 110 right the number of bits specified by the shift count in the arithmetic instruction being executed are transmitted to the I/O interface 102. These shifted bits are sent to either the computer data channel 101 or to the memory 103 via the memory control register bank 104. The same shift and store operation is then performed for the imaginary sum of products held in SOPI register 111.

During the execution of each arithmetic instruction a plurality of memory words will generally be required, each word located in memory at predetermined address intervals. This requirement is met through the use of the address control adder 105, the address register banks 106, and the address increment register bank 109, all shown in FIG. 1. The address control adder 105 is a logical add network having sets of input lines from three sources and three sets of output lines. Adder 105 has the capability of adding the values represented in any two sets of its input lines and transmitting the sum to any of three sets of output lines; it also has the capability of transferring the value represented on any one set of input lines through to its outputs without modification. Address register bank 106 includes a group of address registers, each capable of storing the address of a memory location and each selectable through instructions to receive outputs from address control adder 105. Address increment register bank 109 is likewise adapted to receive outputs from address control adder 105. Registers in both register banks 106 and 109 are also adapted to transmit their outputs to the inputs of address control adder 105. In a typical operation, such as an address register load, address control adder 105 receives data for an address register or an address increment register from memory control register bank 104. The data is transferred through adder 105 without modification and stored in the proper register.

Many of the operations performed by the MAP can be accomplished by proceeding through a series of steps where the memory address data is shifted after each step. To simplify these operations an address and count shift register 113 has been provided as shown in FIG. 1. Register 113 has two sets of input lines and is capable of shifting the value represented on either set of input lines right or left a predetermined number of positions in response to a shift instruction. The shifted value is available on its output lines for transfer to memory control register bank 104. If a shift instruction is being executed, the address control adder 105 receives the contents of the register to be shifted from address register bank 106. The data is passed through the address control adder 105 unaltered and transmitted to the address and count shift register 113. Address and count shift register 113 transmits the shifted data to memory control register bank 104, from which the data is subsequently transferred back to the original register.

The count register bank 115 is comprised of several registers which maintain indexes regulating execution of the arithmetic instruction and some conditional jumps. The count adder 114 functions much as the address control adder 105 in supplying data to the count register bank 115 from the memory control register bank 104. During a load, add, shift, or store instruction, data passing through the count adder is altered as required by the instruction being executed. During execution of an arithmetic instruction, indexes are decremented after each multiply and add so as to terminate the sequences of the arithmetic instruction at the proper time. The contents of a count register are stored in memory 103 by a transmission from the count register bank 115 to the count adder 114, and thence to the address and count shift register 113. The data is shifted by 0 and transmitted to the memory control register bank 104.

Figure 2A:
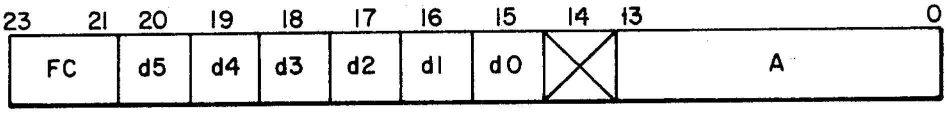
FIGS. 2a and 2b are bit assignment maps describing the usage of the individual bits of each MAP instruction.
Figure 2B:
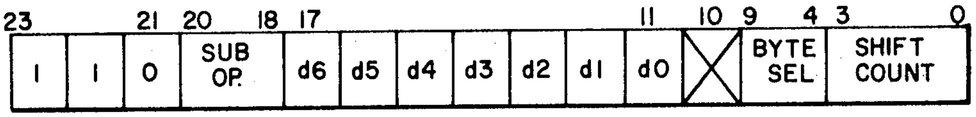

FIGS. 2*a* and 2*b* illustrate symbolically two typical instruction words used in the MAP. The length of the instruction words have been conveniently chosen to be 24 bits in MAP, but other lengths would work equally well. In the explanation that follows the term function code (FC) will mean a three-bit number which identifies a type of instruction, such as arithmetic, load, jump, etc.

Reference to FIG. 2*a* simplifies explanation of bit assignments for instructions having octal function codes 0 through 4. The function code itself is a three-bit quantity stored in bits 23 through 21. Bits 15 through 20 contain director bits d0 through d5 respectively. Bit 14 is unused. Bits 0 through 13 contain a 14 bit A field which may be either an address (function codes 0 and 4) or data (function codes 1, 2, and 3).

Referring now to TABLE I, the operations associated with function codes 0 through 4 are detailed:

TABLE I

| Function Code/ Operation | 0 Halt or Jump | 1 Load Register With A | 2 Add A to Register | 3 Shift Register by A | 4 Store Register at Address in A |
|---|---|---|---|---|---|
| Director bits: | | | | | |
| d0 | Jump or Jump and Halt if B Register ≠0. | d1 d0 | | | |
| | | 0 1 | Select start address registers | | |
| | | 1 0 | Select start address increment registers | | |
| d1 | Jump or jump and half if overflow count register ≠0. | 1 1 | Select increment factor registers | | |
| | | 0 0 | Select count register | | |
| d2 | Jump if result sign positive | Select B register | | | |
| d3 | Jump cr jump and half unconditionally. | Select starting loop count register if d1d0=00, select A sequence registers according to d1d0 otherwise. | | | |
| d4 | Decrement B register if jump condition is met. | Select pass count register if d1d0=00; select B sequence registers according to d1d0 otherwise. | | | |
| d5 | Director bits 1 and 3 functions: jump and half if 0, jump if 1. | Select overflow count register if d1d0=00; select result sequence registers otherwise. | | | |
| Operand A | If jump or halt condition satisfied, A→P register. | A→selected register. | A+selected register→selected register. | Shift selected register by A3–A0; A4=0=→right shift; A4=1=→left shift. | Contents of selected register→address specified by A. |

Each column in TABLE I sets out the director bit and A field usage associated with the function code described in the uppermost box of that column. The director bits modify the operation of each instruction as set out in a tabular form. In general the effect of a particular director bit being set (being equal to 1) is stated in the row in which the number of the director bit occupies the left-most square. Thus if director bit d0 is 1 and the function code is 0, a jump occurs when the B register is unequal to 0. The symbol → indicates a transfer of data.

Inspection of the functions of director bits d1 and d3 for function code 0 show that either a jump or a jump and halt may occur. (The word "jump" in TABLE I refers to an instruction execution condition where the sequence of instructions currently being executed is stopped and a new sequence of instruction is begun.)

Whether a jump or a jump and halt will occur is specified by director bit d5 as explained in the table. For function codes 1 through 4, d1 and d0 function together to specify one of four register classes, to be described in detail later, on which the instruction will operate. Director bits d3 through d5, when set, specify the single register belonging to the class defined by d1 and d0 and described in the box corresponding to the row containing the specific director bit. Director bit d2, however, specifies that B register 506 (FIG. 5) is selected when d1 and d0 are 0 and has no meaning otherwise.

In general the 14 bits of the A field specify the operand for function codes 1 through 3. However, for function code 3 (shift register by A) only the low order four bits contain a shift count. Bit 4, i.e. the bit 5th from the right-most bit of the instruction selects the shift direction: if bit 4 is 0 the shift will be right; if bit 4 is 1 the shift is left. The remaining bits of the A field have no use for function code 3. The bits of the A field supply a storage address in function code 4. After a register has been selected according to the rules for function codes 1 through 4, the contents of that register will be stored in the address specified by the 14 bits of the A field.

The only instruction for arithmetic processing operates recursively with one loop iteratively computing a single matrix element and another loop for regulating generation of the result matrix. The format this instruction, which has a function code of octal 6, is shown in FIG. 2*b*. As can be seen, this format differs substantially from those previously discussed. If director bit d0 is set, instruction execution will halt if either SOPR register 110 or SOPI register 111 overflows. This happens whenever an attempt is made to calculate a sum larger than the holding capacity of the register. Usually, each summation starts with cleared SOPR and SOPI registers 110 and 111. If, however, director bit d1 is set, this clearing will be disabled. This running sum will be stored after each summation. If director bit d2 is set the sum of products will be sent to the memory 103. If director bit d2 is 0, the results are sent to data channel 101. If director bit d3 is set, then if director bit d2 is also set the sum of each set of products will be added to the contents of the memory location specified, and the resultant sum will be stored in that memory location. This is called a "replace add" operation. If director bit d3 is not set, the results will not be replace added to the data in the memory. Director bits d4, d5 and d6 provide additional capabilities which are unimportant to the understanding of the invention. Bits 0 through 3 of the instruction contain a shift count which specifies the number of right shifts to be performed on each sum of products as it is passed through the arithmetic shift register 112 to the I/O interface 102. Bits 4 through 9 of the arithmetic instruction specify up to 6 bytes which can be extracted from each 72-bit sum of products for storage in memory locations or for transmission to the computer data channel 101. Each byte in a sum of products is 12 bits long with the highest order byte being specified by the setting of bit 9 and lower order bytes specifying correspondingly lower order bytes. Bits 18 through 20 specify a sub-operation code, which selects either a generalized complex convolution operation (sub-operation code 2) or special cases of it, as tabulated below.

TABLE II

| Sub-operation code | Calculation |
|---|---|
| 0 | Real convolution; $C_k = \sum_{j=0}^{LC-1} a_{Pj+R}\, b_{(j+k)U+M}$ |
| 1 | Generalized real convolution; $C_k = \sum_{j=0}^{LC-1} a_{Pj+R}\, b_{Uj+Vk+W}$ |
| 2 | Generalized complex convolution; $\overline{C}_k = \sum_{j=0}^{LC-1} \overline{A}_{Pj+Qk+R} \cdot \overline{B}_{Uj+Vk+W}$ |
| 3 | Matrix addition; $a_{Pj}+b_{Uj}$ is transmitted to the location holding $b_{Uj}$. |
| 4 | Unrelated operation. |
| 5 | Sum of squares; $C_k = \sum_{j=0}^{LC-1} (a_{Pj+R})^2$ |

Figure 3:
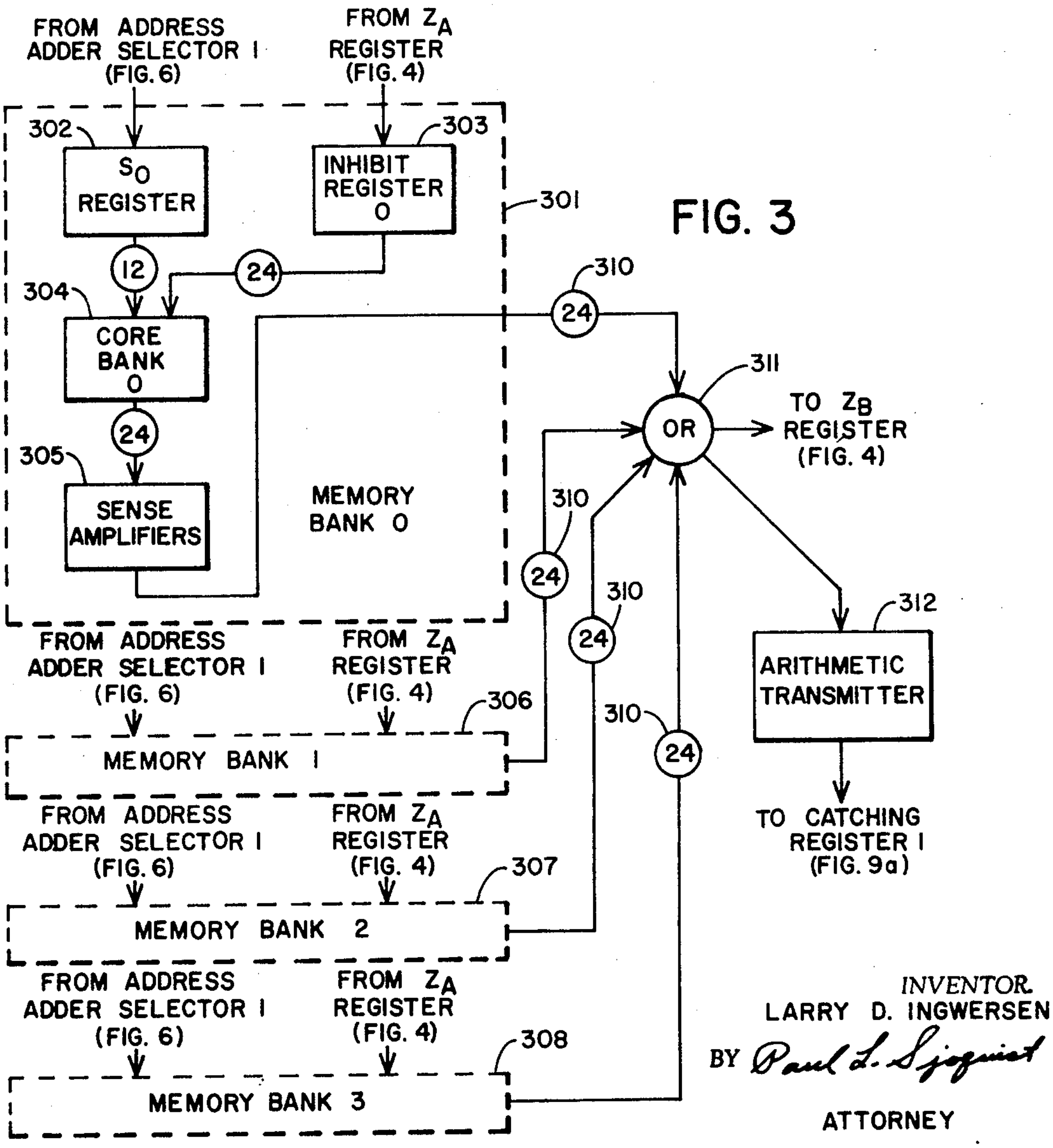
FIG. 3 is a more detailed block diagram of the memory.

In referring to FIGS. 3 through **9*b*, several conventions and implicit assumptions are present. Referring to FIG. 3 as exemplary, small circles 310 are conventional insertions to denote parallel transmissions of data. The number within the circle denotes the number of bits involved in the transmission. On occasion, the letter U or L will be present within the circle also. These letters refer to the transmission of the specified number of bits from the extreme upper or extreme lower part, respectively, of the register transmitting the data. It is assumed that every register has its own input gates which prevent the alteration of data within the register until an enable signal is received by the gates. These enabling signals, as well as other control and timing signals, are not illustrated, but are generated by the apparatus illustrated in FIG. 7** which will be explained later. The mechanics of supplying the proper timing and control signals is a simple matter for one trained in logic design.

Referring to FIG. 3 in explaining the operation of the memory, the memory is made up of four banks, 301, 306, 307, and 308. Each memory bank contains 4,096 24-bit data words in the preferred embodiment. To each data word in a bank is assigned an address from 0 through 4,095, 0–7777 in octal. Reference to the core bank number, and the bank address, uniquely defines each data word within the memory. Operation of memory bank 301, which is also denoted as memory bank 0 in FIG. 3, will be explained and is illustrative of the operation of all the memory banks. Each memory cycle comprises a read and a write (restore) operation.

Figure 6:
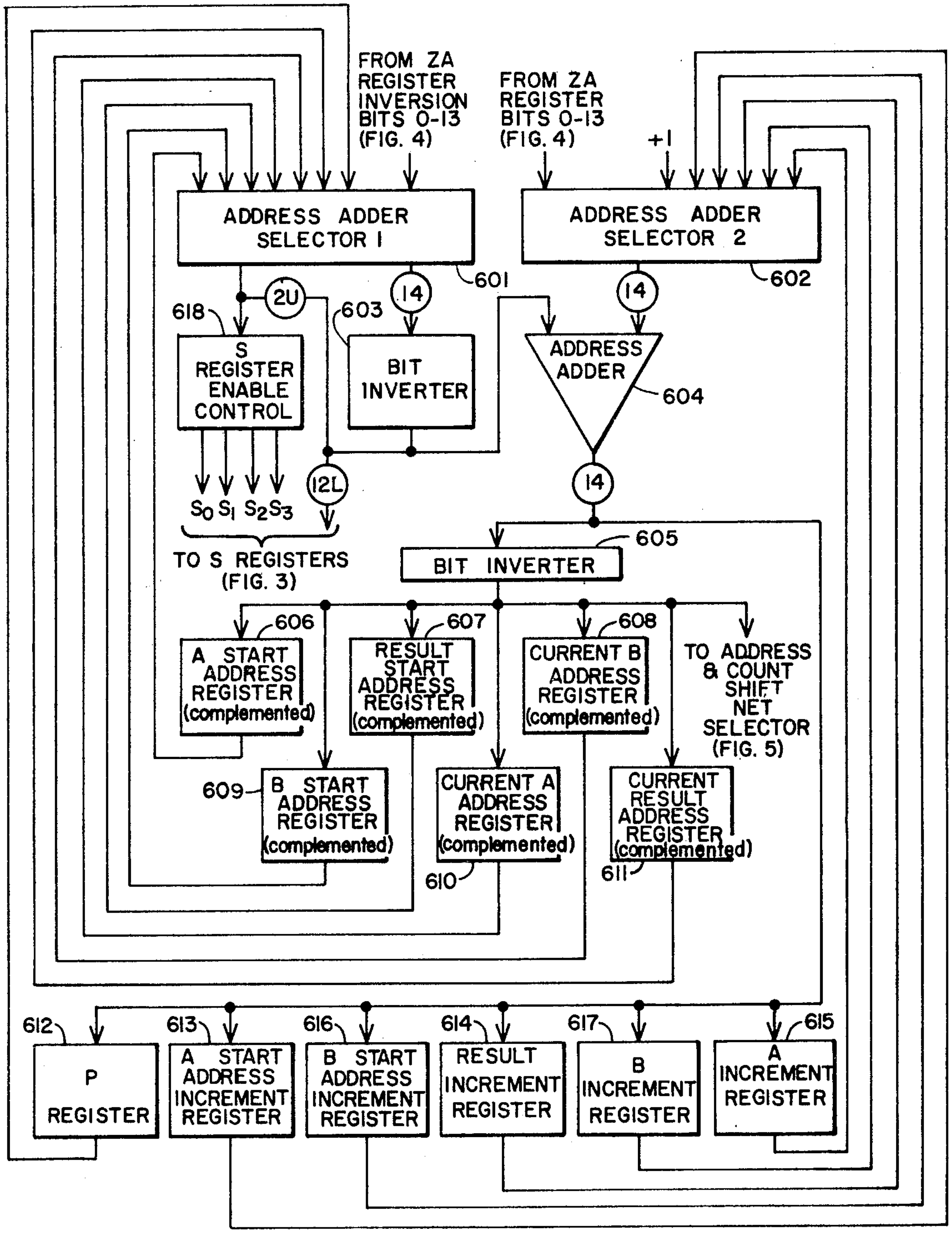
FIG. 6 is a detailed block diagram of the address adder, the address register bank, and the address register increment bank.

When a cycle is initiated for memory bank 0, a 12 bit address is transmitted to the SO register 302 from address adder selector 601 of FIG. 6. This address is transmitted to core bank 304 where enabling signals from S register enable control 618 of FIG. 6 causing a data signal representing the stored bits to be transmitted to the sense amplifiers 305. The address and enable signals collectively are referred to as term identification signals when used to read up arithmetic operands. The data signal from core bank 304 is amplified and transmitted to data OR 311. Since core bank 304 is comprised of the usual DRO (destructive read-out) cores, it is necessary to restore the data word. On the restore cycle, the data signal is passed from OR 311 through several ranks of registers within the memory control register bank 104 (FIG. 1) finally being transmitted to inhibit register 303. An enable signal allows inhibit register 303 to receive this data and hold it for core bank 304. Another enabling pulse causes the original data to be written back into the address contained in the SO register 302. When new data is to be written into memory 103, the data read out is changed to the new data as it passes through the memory control register bank 104 and placed in memory during the restore operation. The data OR 311 receives 24-bit data transmissions from all the memory banks. Since the sense amplifiers 305 in each inactive memory bank will be transmitting 0's to the data OR 311, only the core bank being read will be supplying data bits to the data OR 311. The data OR 311 transmits each word not only to the memory control register bank 104, but also to the multiply/add module 107 (FIG. 1). If the arithmetic instruction is being executed, the data is gated to the arithmetic section.

Figure 4:
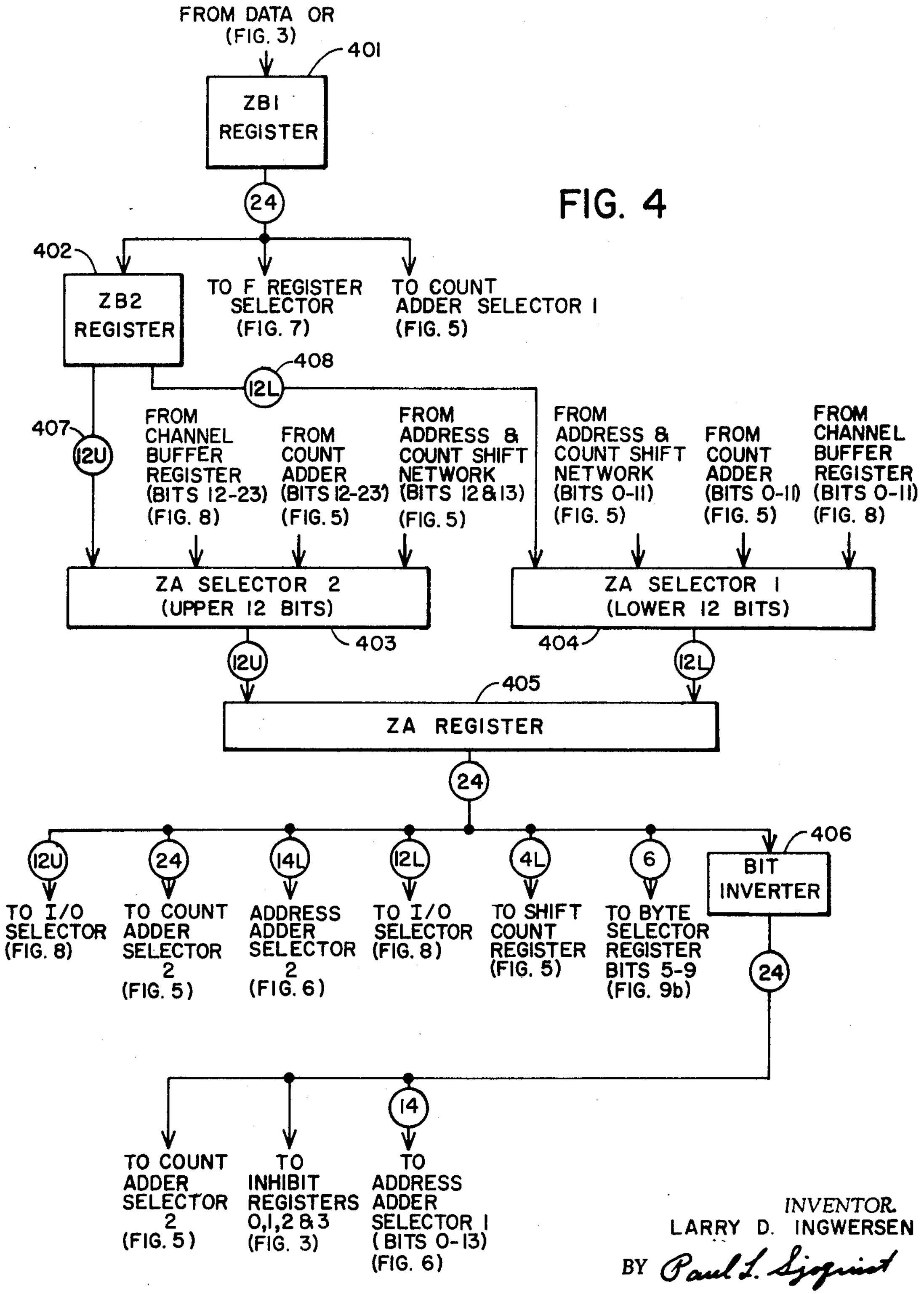
FIG. 4 is a detailed block diagram of the memory control register bank.

Referring next to FIG. 4, data from the data OR 311 of FIG. 3 is received by the ZB1 register 401. If a read operation has been selected, data from the ZB1 register 401 is transmitted to three places, viz. ZB2 register 402, F register selector 701 of FIG. 7, and count adder selector 501 of FIG. 5. The upper 12 bits of ZB2 register 402 are transmitted to ZA selector 403. The 12 lower bits are transmitted to ZA selector 404. These are the paths taken within the memory control register bank by data being read from memory 103. But depending on control signals to the ZA selectors 403 and 404, other registers may be selected as data sources for ZA register 405. These sources are shown in FIG. 4 as alternate inputs into ZA selectors 403 and 404. Thus we see that the two ZA selectors 403 and 404 function as multiplexers allowing data from a desired source to pass through to ZA register 405 and preventing data from unwanted sources from reaching that register. This is true not only for the ZA selectors, but also for all other selectors in this apparatus. The data held by ZA register 405 can have several destinations, shown in FIG. 4 as alternate outputs from ZA register 405. The ZA register 405 data is complemented by a bit inverter 406 and transmitted to the inhibit registers in memory banks 301, 306, 307 and 308 when restoring data for a read operation and supplying the new data for writing. (The inhibit registers require complemented data because of the design of the core banks, which requires the inhibit register data to be stored in the core banks complemented.) The complement (from bit inverter 406) of the data in ZA register 405 has several alternate destinations also as shown in FIG. 4.

Figure 5:
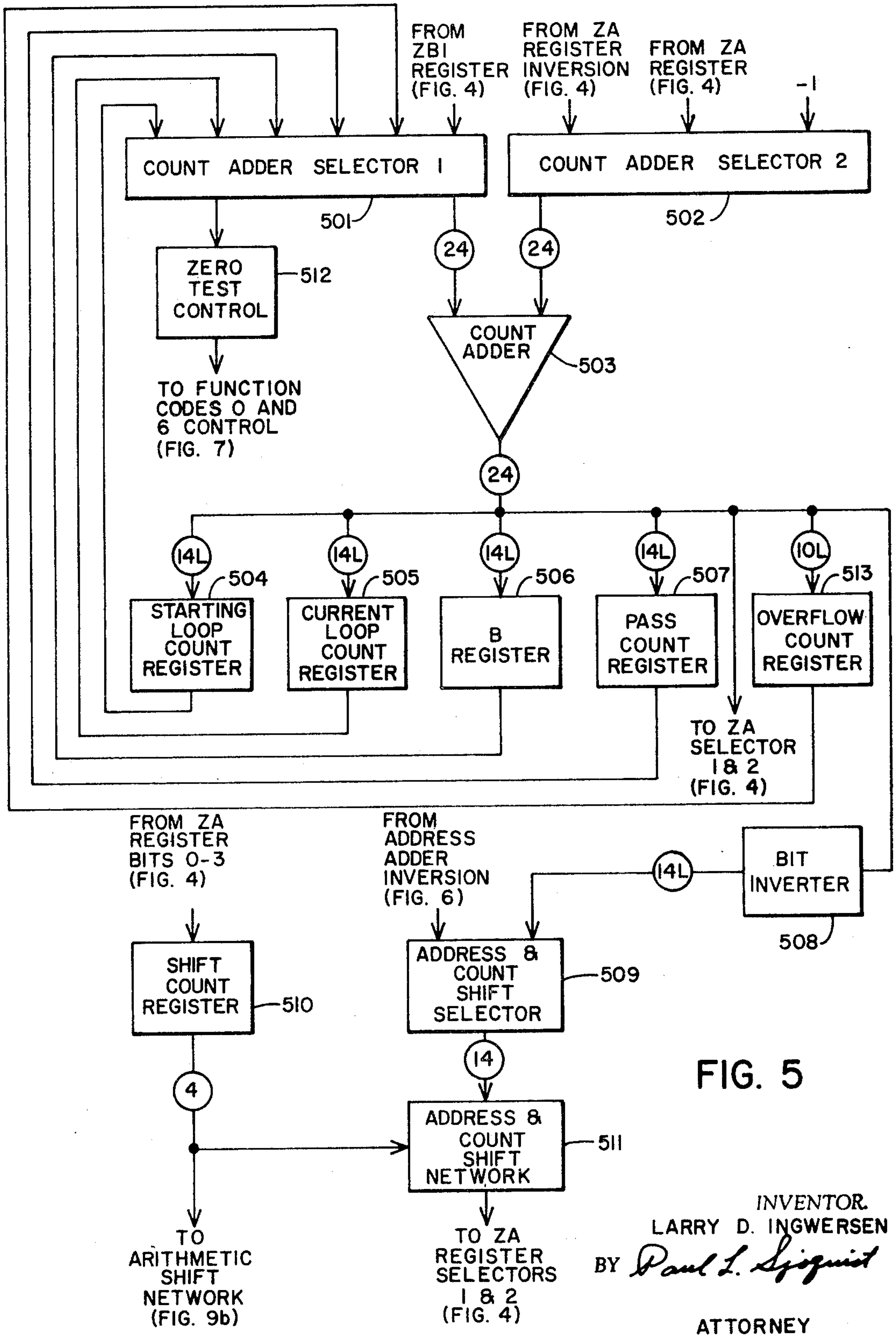
FIG. 5 is a detailed block diagram of the count adder, count register bank, and arithmetic and count shift logic.

The count adder 114 and count register bank 115 of FIG. 1, shown in greater detail in FIG. 5, handle the indexing for the processor. These indexes are held in five registers, starting loop count register 504, current loop count register 505, B register 506, pass count register 507, and overflow count register 513. All data received by these five registers must pass through count adder 503. Count adder 503 adds the numbers supplied by count adder selector 501 and count adder selector 502. In response to enabling signals from instruction decoder 108, of FIG. 1, each of these two selectors can select one of its inputs, or none at all. If one selector has no input selected, then 0's will be furnished to count adder 503 and count adder 503 acts merely as a transmitter, passing the data from the other selector through without being altered. Whichever register receives the output from count adder 503 must have its input gates enabled. The registers with disabled input gates will not be altered.

To understand the use of these count registers in each instruction, refer first to TABLE I. For function code 0 (halt or jump), B register 506 and overflow count register 513 are involved. The B register 506 is used for indexing in an instruction loop. After loading, it can be continually tested and decremented by set director bits d0 and d4 in a jump instruction. Each time such a jump instruction is executed, B register 506 will be selected by count adder selector 1, 501, and tested by zero test control 512. If director bit d0 is set and zero test control 512 finds the B register 506 contents when they pass through count adder selector 501 not 0, the jump occurs. If B register 506 is 0 no jump occurs. If director bit d4 is also set, this causes count adder selector 502 to select the minus 1 input. This is then added to the B register 506 contents as it passes through count adder 503 and decrements them. When director bit d4 is set in a jump instruction, the input gate of B register 506 is enabled, and the decremented value is loaded into B register 506.

The overflow count register 513 is decremented by overflow conditions arising in the arithmetic instruction. If an unload overflow (see discussion of FIG. 9, infra) should occur, the overflow count register 513 will be selected by count adder selector 501, and count adder selector 502, will select minus 1. An operation very similar to the decrementing of B register 506 will cause the contents of the overflow count register 513 to be decremented by 1.

Function codes 1 through 3 with directors bits d0 and d1 both 0 also involve these count registers. (See TABLE I.) If a load register instruction (function code =1) with director bits d0 and d1 both 0 is executed, then director bits d2 through d5 specify a count register to be loaded. If, for example, we assume d4 is set, pass count register 507 will be loaded. The instruction decoder 108 will enable the input gate to the pass count register 507. It will also enable the low order 14 bits of the count adder selector 2, 502, to accept data from the uncomplemented 14 lower bits of ZA register 405, which contains the A field of the load instruction being executed. It will select nothing in count adder selector 501. The 14 low order bits of data gated by count adder selector 502 (viz., the A field of the instruction) are added to 0 by count adder 503, and transmitted to all five registers directly receiving data from it. Since only pass count register 507 has its input gates enabled, it receives the 14 bits of the A field. The same operation occurs with the other three registers specified by director bits d2, d4, or d5 are selected. If an add (function code 2) is to be performed, operation is identical except that when the selected register is enabled, the count adder selector 501 is also enabled to select the specified register's output. When the data from count adder selector 502 is sent to count adder 503, the prior contents of the selected register is sent to the count adder through the count adder selector 501. The sum will then be transmitted to the register having enabled input gates, identical to the load instruction.

With the shift instruction (function code 3), different data paths are involved, however. If overflow count register 513 is to be shifted, it will be read up by count adder selector 501, passed through count adder 503 without change, and sent to bit inverter 508. Address and count shift net selector 509 is enabled by instruction decoder 108 to accept the low order 14 complemented bits of count adder 503 and sends these 14 bits to address and count shift net 511. The shift count register 510 has, during this time, received the low order 4 bits from ZA register 405. The address and count shift network 511 then shifts the data selected by the selector 509 the number of bits specified by the shift count register 510. Bit A4 of the A field specifies the direction of the shift. (See TABLE I.) The output of address and count shift network 511 is then selected by ZA selectors 404 and 403 (FIG. 4), and sent to the low order 14 bits of ZA register 405. Count adder selector 502 then selects ZA register 405. Count adder selector 501 is now disabled so zeros will be sent by it to count adder 503. The shifted data then passes through count adder selector 502 and count adder 503 is placed in the enabled register which in this case is overflow count register 513.

For the store instruction (function code 4), the sequence of events is again very similar. Count adder selector 501 reads up a count register selected by director bits d2 through d5. Assume that d3 is set meaning that starting loop count register 504 is selected. Its contents passes through count adder selector 501 and count adder 503. The data is sent to ZA selectors 404 and 403 respectively (FIG. 4). These ZA selectors are enabled by instruction decoder 108 (FIG. 1) and allow the data in starting loop count register 504 to be stored in ZA register 405. With the data now in ZA register 405, a write sequence, as already explained, stores the data in memory 103. The address for storing the data originates in the A field of the instruction and is sent to the appropriate S register through address adder selector 601 of FIG. 6. Since these count registers are less than 24 bits, ZA selector 403 allows only the lower two bits in it (bits 12 and 13 from the counter adder) to go to ZA register 405. The read operation of the memory cycle has stored the original contents of the memory word in ZA register 405 prior to the count adder-to-ZA register transmission. The count register data is stored in the lower 14 bits of ZA register 405 and the upper 10 bits are unaltered. Then when the restore operation is initiated, the word will be placed in memory with the high order 10 bits unaltered.

The arithmetic instruction makes use of all the count registers except B register 506. This instruction is designed to compute a plurality of sums of products. See TABLE II. All the count registers involved in the arithmetic instruction must be preset before its execution. Upon initiating an arithmetic instruction, the function code 6 control 709 (FIG. 7) transmits a select signal to the appropriate sub-operation code control. This causes the sub-operation code control to emit a plurality of retrieve signals. Each retrieve signal is sent to the address register and address increment register banks 106 and 109 and cause memory references, to be explained in greater detail infra, which extract operands from memory 103 during arithmetic execution. The starting loop count register 504 is called up after the first product is formed, decremented by 1, and stored in current loop count register 505. Thereafter current loop count register will be read up after each product is formed, tested to be equal to 0, and stored back in current loop count register 505. When zero test control 512 detects 0, the products necessary to form the specified sum of products have all been summed and the contents of SOPR and SOPI registers 110 and 111 (FIG. 9 or FIG. 1) are unloaded as specified by TABLE I. At this time pass count register 507 is read up, tested for 0, decremented and stored back. If not 0 another sum of products operation is initiated with emission of another select signal by function code 6 decoder 709. If 0, execution of the arithmetic instruction is terminated. An overflow test is constantly being made on the sums of products being computed. If at any time an unload overflow (see discussion of FIG. 9, infra) occurs, overflow count register 513 is decremented by 1 in the usual manner. This gives an indication of how many sums of products may be incorrect because of overflow.

Count adder 503 also functions as an arithmetic adder for sub-operation code 3 of the arithmetic instruction. (See TABLE II.) The indexing necessary to address each successive element of the A and B matrices will be discussed later in conjunction with FIG. 6. The summation proceeds very rapidly because each sum is stored by the store portion of the B matrix memory cycle. Computation of each sum is initiated by reading up of the element from the A matrix. It is enabled through the memory control register bank to ZA register 405. The A element is then restored in its memory word, and the B matrix element is read into ZB1 register 401. Count adder selector 501 is then enabled to select ZB1 register 401. Simultaneously, count adder selector 502 is enabled to select ZA register 405. Count adder 503 forms the 24 bit sum of these two values. The sum is transmitted to ZA selectors 404 and 403 respectively. (FIG. 4), which gate the sum to ZA register 405. At this time the write portion of the memory cycle is initiated and the sum is stored in the word formerly containing the B matrix element.

Having described the count register logic, the address register logic shown in FIG. 6 will now be described. In many ways these two are similar. There are six address registers which specify the locations from which the A and B matrix elements are extracted and the location where the result is stored. These are tabulated in TABLE III. They are related to subscript constants of the equations in TABLE II.

TABLE III

| Register Name | Drawing Reference | Table II Equivalence |
|---|---|---|
| A Start Address | **606** | $Qk+R$ (This register specifies the address of the first element of the A matrix used in each sum of products.) |

| | | |
|---|---|---|
| B Start Address | 609 | Vk+W (The comments for the A Start Address Register are appropriate.) |
| Result Start Address | 607 | No analogy. |
| Current A Address | 610 | Pj+Qk+R (This register specifies the current address of each element of the A matrix as it is extracted from memory for usage in computing the sum of products.) |
| Currect B Address | 608 | U j+Vk+W (The comments for the Current A Address Register are appropriate.) |
| Current Result Address | 611 | (k × Result Increment Register) + Result Start Address Register (This register specifies the address of the destination for the sum of products computed using k to determine the A and B matrix elements used.) |

Each of these registers contains the address in complemented form. (This is due to characteristics of the circuits used, so another design might very well find it more efficient to store these addresses in uncomplemented form.) All of these registers can be individually selected by address adder selector 601 for feeding through bit inverter 603 to the S registers and the address adder 604.

A second group of registers, five in number, store increments which are added to the address registers at appropriate times during arithmetic execution for addressing of new operands. The relation of these increment registers to TABLE II is set out in TABLE IV.

TABLE IV

| Register Name | Drawing Reference | TABLE II Equivalence |
|---|---|---|
| A Start Address Increment | 613 | Q. (This register contains the value which must be added to the address of the first element from the A matrix used in calculating $C_k-1$, where $C_k$ is about to be calculated, to determine the address of the first A matrix element involved in the current sum of products calculation.) |
| B Start Address Increment | 616 | V. (The comments for the A Start Address Increment are appropriate.) |
| Result Increment Register | 614 | None. (This register contains the value which must be added to the address of the word storing $C_k-1$ to store $C_k$ in the desired memory word, $C_k$ being the sum of products to be stored.) |
| A Increment | 615 | P. (This register stores the value which must be added to the address of the A matrix element currently being multiplied to determine the address of the next A matrix element involved in a multiplication.) |
| B Increment | 617 | U. (The comments for the A Increment Register are appropriate.) |

P register 612 contains the address specifying the memory word containing each instruction when the processor is executing instructions in memory mode. After each instruction has been received from memory 103, P register 612 is incremented by 1 causing it to specify the address of the next instruction to be executed. This pattern is interrupted only by a jump instruction (function code = 0) execution in which the jump condition is satisfied. In this case the bits of the A field of the instruction are transmitted to P register 612 via address adder 604, overriding, for the execution of the jump instruction only, the normal +1 increment of P register 612 and specifying the address of the next instruction to be executed from the A field.

The address registers are read and altered in a fashion very similar to the count registers. Reference to TABLE I will aid in explaining the instructions involved in manipulating the contents of these registers. Directors bits d0 and d1 select one of the three groups of address registers, as shown in TABLE I under function codes 1 through 4. Thus when director bits d1 and d0 are 0 and 1 respectively, the start address registers, viz. A start address register 606, B start address register 609, and result start address register 607, will be referenced. Which of the three is referenced is determined by director bits d3 through d5. If A start address register 606 is to be referenced, then director bits d0 and d3 must be set in the instruction. To more clearly explain the operation, assume that an add (function code =2) is to be performed on A start address register 606. Instruction decoder 108 enables address adder selector 1, 601, to gate the contents of A start address register 606 to bit inverter 603. Simultaneously the low order 14 bits of ZA register 405 are selected by address adder selector 602. Address adder 604 receives the now uncomplemented A start address and the A field of the instruction and adds them. This sum is inverted by bit inverter 605 and transmitted to the address registers. Instruction decoder 108 causes the input gates of A start address register 606 to be enabled and store the sum in the register in complemented form.

The output of bit inverter 605 is also transmitted to address and count shift net selector 509. When the shift instruction (function code =3) is executed, the output of the address adder is gated to address and count shift net 511. From that point onward the shift operation is analogous to the shift instruction as explained for the count registers.

When the address registers are used to specify addresses to memory 103 for extraction of operands for the arithmetic instruction, the contents of each address register as needed is gated by address adder selector 601 through bit inverter 603, where it is split up. The two upper bits are sent to S register enable control 618 and the 12 lower bits are sent to all four S registers. If, e.g., the upper two bits of the selected address register are 0, the input gates of SO register 302 are enabled, thereby allowing it to receive the 12 bit address specifying one memory word within its associated core bank 304. Similarly, memory banks 306 through 308 (FIG. 3) respectively, are referenced.

All of these operand address registers may be used in the execution of the arithmetic instruction. As an example of these address registers, I will describe the addressing involved in calculating the coefficients for a generalized complex convolution. The imaginary coefficient of each complex number must immediately follow the real coefficient of that number, so that the address of the imaginary coefficient is one greater than that of the real. TABLE V sets out the activities of the registers and the selectors processing the addresses. The following abbreviations will be used in TABLE V:

| | |
|---|---|
| A Start Address Register | ASA |
| B Start Address Register | BSA |
| Result Start Address Register | RSA |
| Current A Address Register | CAA |
| Current B Address Register | CBA |
| Current Result Address Register | CRA |
| A Start Address Register Increment | ASAI |
| B Start Address Increment Register | BSAI |
| Result Increment Register | RI |
| B Increment Register | BI |
| A Increment Register | AI |
| Address Adder Selector 1 | AAS1 |
| Address Adder Selector 2 | AAS2 |
| Address Adder | A Adder |

In TABLE V, the columns labeled AAS1 and AAS2 describe the operations of the address adder selectors 601 and 602 respectively, at the times specified in the "time" column. Time between suscessive times need not be equal. The activities under the A Adder column specify the register receiving the output from the adder. The S register column specifies when a memory read or write is to occur (which requires an address transmission from address adder selector 601).

TABLE V

| Time | AAS1 | AAS2 | A Adder | S Register |
|---|---|---|---|---|
| 1 | Select ASA | Select +1 | | |
| 2 | | | Enable CAA input. | Enable S Register input. |
| 3 | Select BSA | Select +1 | | |
| 4 | | | Enable CBA input. | Do. |
| 5 | Select CAA | Select AI | | |
| 6 | | | Enable CAA input. | Do. |
| 7 | Select CBA | Select BI | | |
| 8 | | | Enable CBA input. | Do. |
| 9 | Select CAA | Select +1 | | |
| 10 | | | Enable CAA input. | Do. |
| 11 | Select CBA | Select +1 | | |
| 12 | | | Enable CAB input. | Do. |
| . | | | | |
| . | | | | |
| . | | | | |
| $T_1$ | | | Enable CBA input. | Do |
| $T_1+1$ | Select RSA | Select +1 | | |
| $T_1+2$ | | | Enable CRA input. | Do. |
| $T_1+3$ | Select CRA | Select RI | | |
| $T_1+4$ | | | Enable CRA input. | Do. |
| $T_1+5$ | Select ASA | Select ASAI | | |
| $T_1+6$ | | | Enable ASA input. | |
| $T_1+7$ | Select BSA | Select BASI | | |
| $T_1+8$ | | | Enable BSA input. | |

Times 1 through 8 deal with the address manipulations necessary to get the first real and imaginary coefficients selected from each matrix. Times 1 and 2 perform the address selection for reading up the real coefficient of the first complex number from the A matrix. Also, current A address register 610 is set to the address of the imaginary coefficient of the first complex number. During times 3 and 4 the address of the real coefficient of the first term from the B is sent to memory. During times 5 and 6, the address of the imaginary coefficient of the first term from the A matrix used in the computation is sent to memory. Times 7 and 8 perform the same operation for the imaginary coefficient of the first term from the B matrix. After time 8 the multiply-add module has all four coefficients necessary for the first complex product. These addressing operations continue through time $T_1$, after the last imaginary coefficient is read from memory 103. At this point current loop count register 505, which has been set to the contents of the starting loop count register after time 8 and decremented by one at that time and after every succeeding product, has reached 0. At times $T_1+1$ and $T_1+2$ the storage address for the result is read up and incremented properly to allow storage of the two result coefficients and then current result address register 611 is incremented by the contents of result increment register 614. Following this operation, at times $T_1+5$ and $T_1+6$ A starting address register 606 is incremented by the contents of start address increment register 613, which presets A starting address register 606 for the computation of the next summation. Similar activities at time $T_1+7$ and time $T_1+8$ preset B starting address register 609.

Successive complex results in a convolution are computed similarly, pass count register 507 being decremented by one after the storage of each complex result. The addresses specifying the storage for results are, after the first loop, always taken from current results address register 611, however. When pass count register 507 reaches 0, computation of coefficients has been completed and execution of the instruction ceases.

If it is desired to change an increment part way through a convolution, the pass count must be set to terminate the arithmetic instruction after the convolution result (real or complex) where the increment must be changed. The increment is changed, the pass count reset to terminate the arithmetic instruction at the next point of change and the arithmetic instruction is reexecuted.

Figure 7:
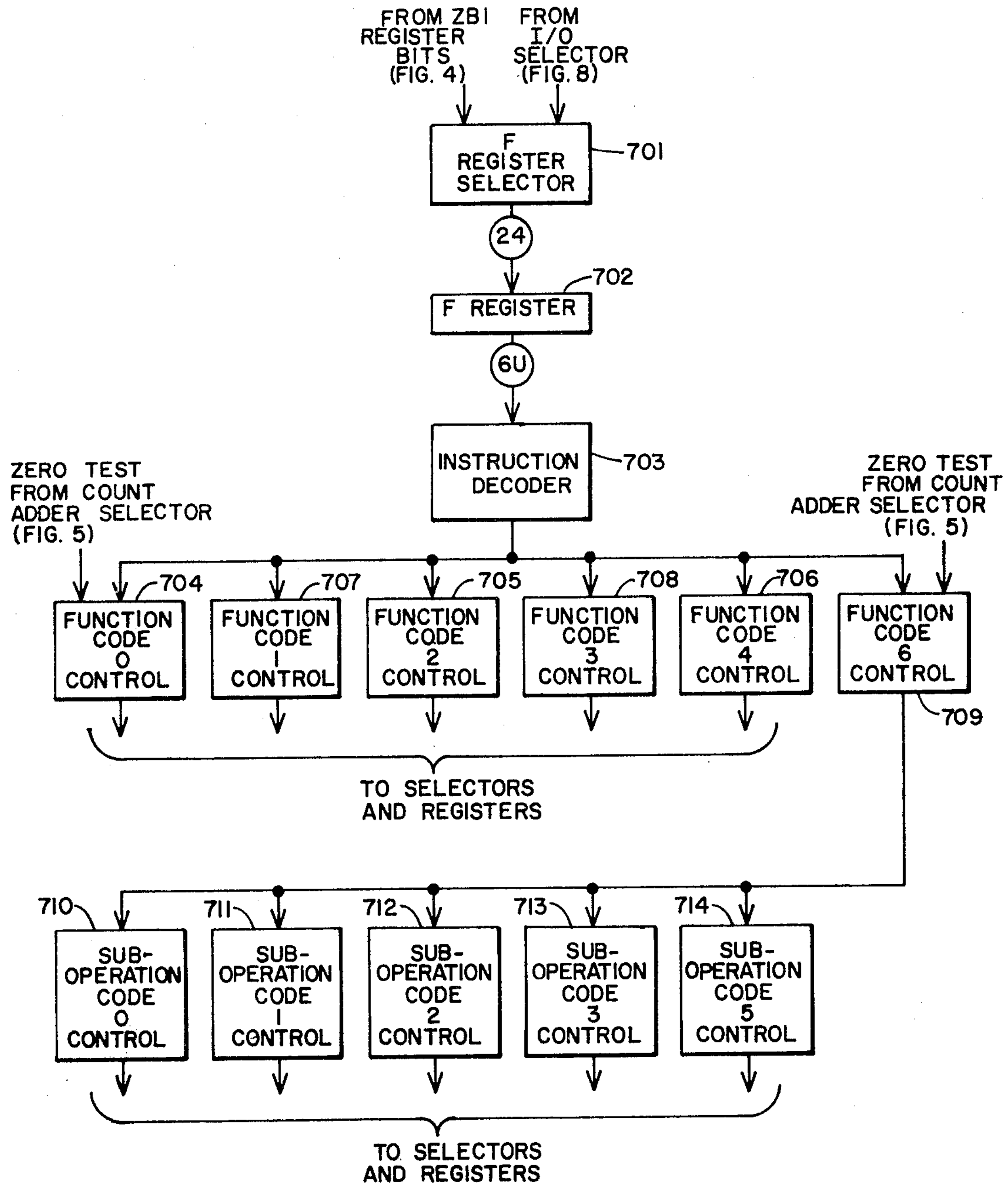
FIG. 7 is a detailed block diagram of the instruction decoder.

FIG. 7 is a more detailed diagram of instruction decoder 108. If the MAP is in memory instruction mode, F register selector 701 is enabled to receive data from ZB1 register 401 of FIG. 4. If in data channel instruction mode, F register selector 701 gates data from I/O selector 802 to F register 702. Regardless of the source, F register 702 contains the entire instruction including director bits, before execution. The instruction decoder then enables either one of five function code controls, 704 through 708 respectively, or function code 6 decoder 709, depending on the function code of the instruction. Function code controls 704 through 708 when enabled generate a series of enabling pulses. These enabling pulses are sent to the proper selectors and registers according to a predetermined timing sequence to cause execution of the selected instruction. If the instruction is function code 6, further decoding of the sub-operation code is necessary, and this is done by function code 6 decoder 709. One of the sub-operation controls, 710 through 714 will be enabled and, similar to function code control 704 through 708 operation, will generate a series of enabling pulses. These time-sequenced enabling pulses cause the various arithmetic and control registers to accept data at the proper times to solve the equations listed in TABLE II for the specified sub-operation code. Since function code 0 and function code 6 include decision making capabilities, function code 0 control 704 and function code 6 decoder 709 must receive a signal from zero test control 512 (FIG. 5) whenever a zero test is made by it. In the case of function code 0 control 704, this determines whether the jump condition is satisfied. In the case of function code 6 decoder 709, this determines when computation of a term has been completed (loop count =0), when all required terms have been computed (pass count =0), or when more than the stated tolerable number of unload overflows have occurred (overflow count =0). In each case the zero test signal initiates emission of different enabling pulses necessary to properly execute the instruction. After each instruction has been completed, control logic (not shown) performs the operations necessary for proper termination of one instruction and initiation of another.

While the control logic described is quite detailed, anyone skilled in the art of digital logic design would have no trouble designing control logic supplying the proper enabling signals at the proper times. Since this design requires only the effort of a skilled mechanic, and since the control circuitry design must depend so much on the individual characteristics of the logic circuitry used, no further discussion of the generation of control signals will be made.

Figure 8:
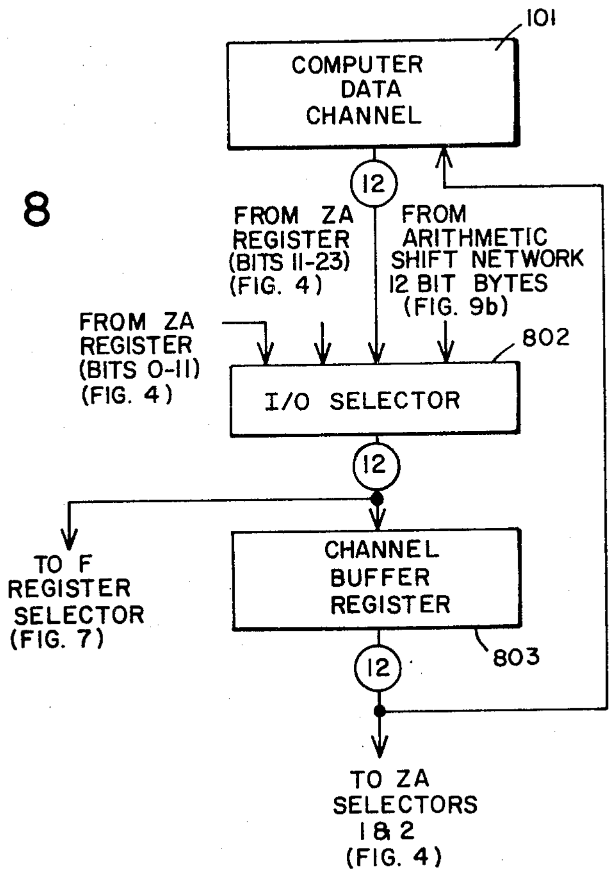
FIG. 8 is a detailed block diagram of the input/output logic of the MAP.

FIG. 8 shows in detail data transmissions between the MAP and computer data channel 101. When data is transmitted to the MAP I/O selector 802 accepts 12 bit words from computer data channel 101. These bits are gated into channel buffer register 803, or to F register selector 701. This latter path is selected only when the MAP is in data channel instruction mode. Since only 12 bits at a time are received from computer data channel 101, transmission from I/O selector 802 to F register selector 701 must alternate from the upper 12 bits of F register selector 701 to its lower 12 bits. Thus after having been placed in data channel instruction mode, the first 12 bit transmission is to the upper 12 bits of the first instruction. The second transmission is to the lower 12 bits. Succeeding data channel instructions comprise alternately upper and lower halves of instruction words.

If the input word from computer data channel 101 is not an instruction for immediate execution, the input gate for channel buffer register 803 is enabled. Input data in this register is alternately accepted by ZA selectors 404 and 403 respectively, and gated to their respective sides of ZA register 405. Thus, a 24-bit data word is assembled in ZA register 405 from two 12-bit input words in fashion similar to the assembly of a data channel instruction word in F register 702.

Output of data from the MAP to computer data channel 101 can be initiated in two different ways. Computer data channel 101 can transmit a command to MAP on control lines not shown causing it to initiate an output data sequence. In that case words to be transmitted to computer data channel 101 are sequentially read up from memory 103 and loaded into ZA register 405. Alternately, upper and lower halves of ZA register 405 are gated by I/O selector 802 to channel buffer register 803. After each 12-bit half word arrives in channel buffer register 803, it is gated to computer data channel 101 by the channel itself. Alternatively, output can be initiated by the execution of the arithmetic instruction itself. As SOPR and SOPI registers 925 and 926 respectively are shifted by and emerge from arithmetic shift network 931, 12-bit bytes starting with the highest order 12 bits selected by the arithmetic instruction, are transmitted to I/O selector 802. Each 12-bit byte is gated in turn to channel buffer register 803. If the arithmetic instruction being executed has selected data output mode (director bit d2=0) the 12-bit word is transmitted to and accepted by computer data channel 101. If director bit d2 of the arithmetic instruction being executed is 1, the result of the arithmetic operation will take the already described path to ZA register 405 from which it will be stored in memory 103.

Figure 9A:
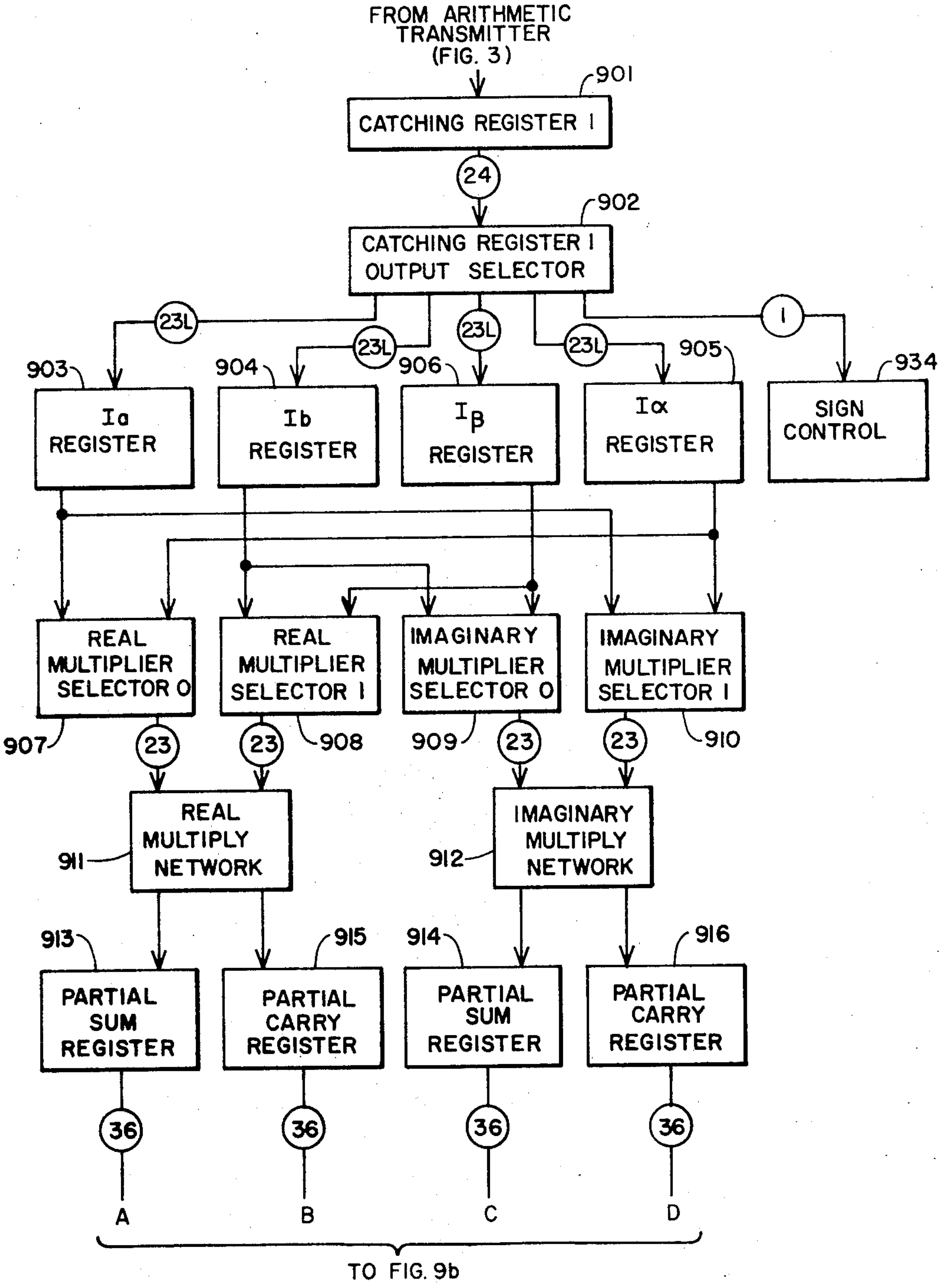
FIG. 9a and 9b are a detailed block diagram of the arithmetic unit.
Figure 9B:
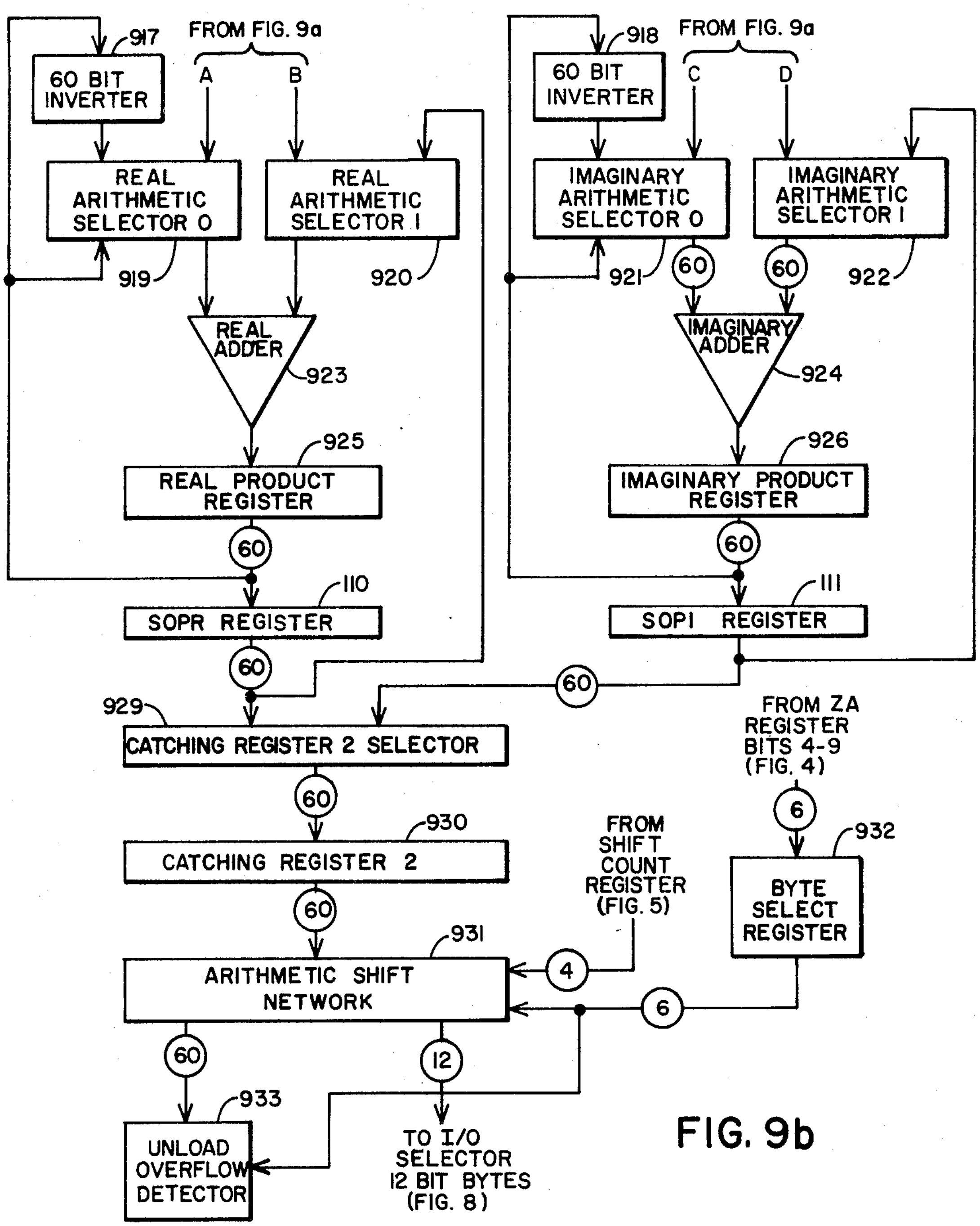
Figure 10:
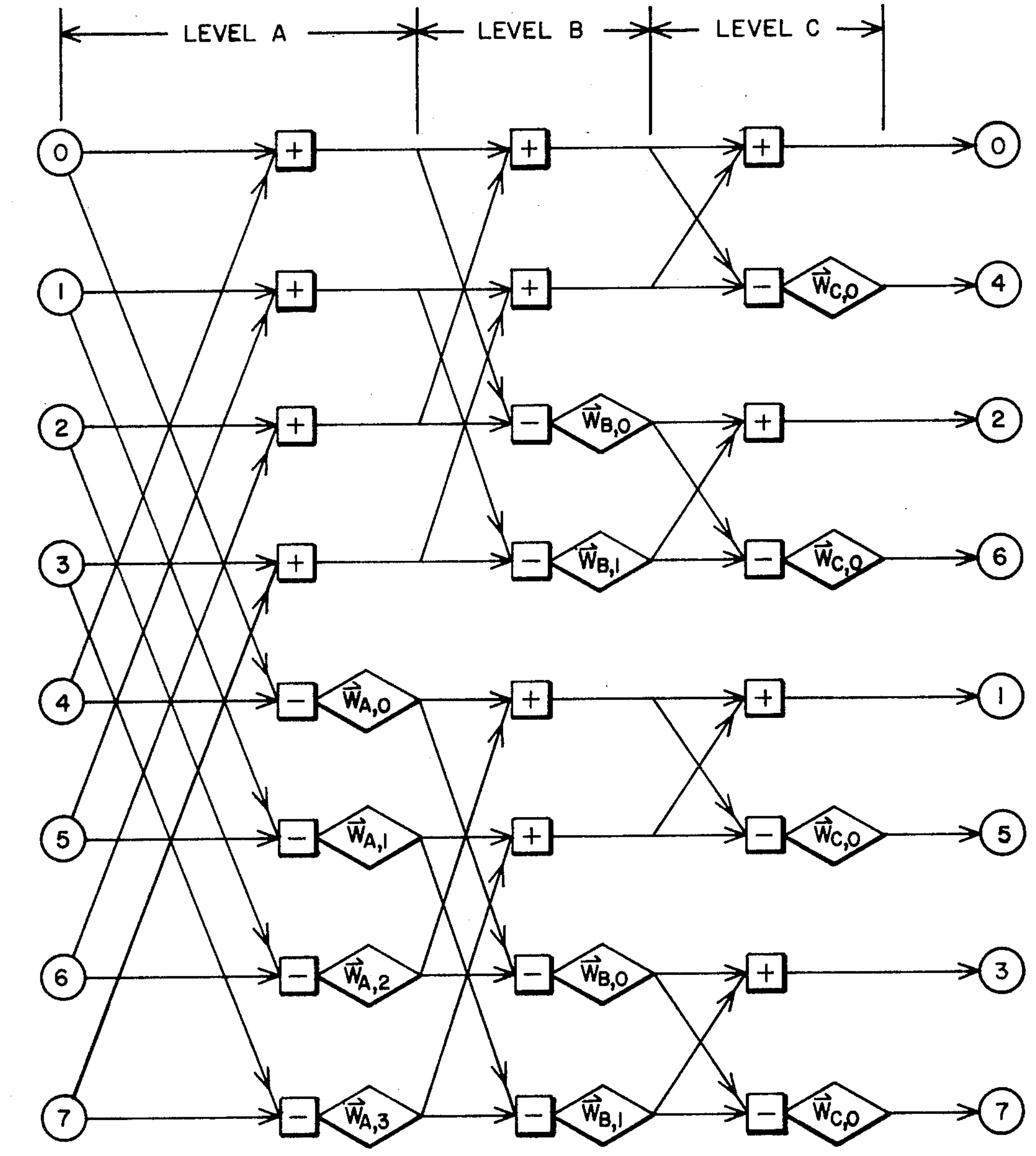
FIG. 10 is a diagram illustrating the operation of the FFT algorithm previously described.
Figure 10:
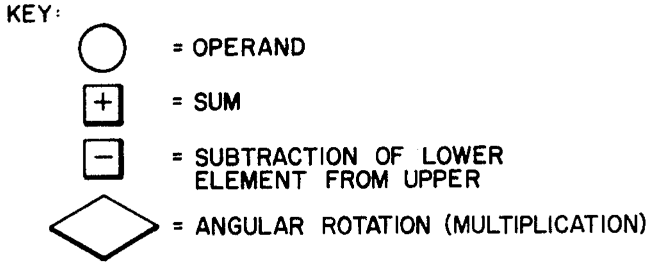

FIGS. 9*a* and 9*b* describe in detail the operation of the logic involved in arithmetic processing. The operation will be described for the GCC, which is the most complicated operation. The simpler sum of products operation sequences can be easily determined after thoroughly understanding the GCC operation sequence. Initially, SOPR and SOPI registers 110 and 111 are cleared if director bit d1 of the arithmetic instruction being executed is set. Then memory cycles to read the first four coefficients are enabled. (See TABLE V.) All operands are received from arithmetic transmitter 312 (FIG. 3) by catching register 901. The output of catching register 901 is gated by catching register 1 output selector 902 to one of four registers after converting it to a 23-bit absolute value. The sequencing of data to each register can best be understood by reference again to TABLE V. During times 1 and 2 a retrieve signal initiates extraction of the real coefficient of the first complex value from the A matrix from memory 103. Its sign is sent to sign control 934 and its 23-bit absolute value is sent to Ia register 903. It also initiates a second memory reference (TABLE V, times 3 and 4) placing the 23-bit magnitude of the real coefficient of the first complex value from the B matrix into Ib register 904. Similarly, the imaginary coefficients of the first selected terms from the A and B matrices are placed in I$\alpha$ register 905 and I$\beta$ register 906, respectively, responsive to the retrieve signal. With these coefficients stored in these four registers, real multiplier selector 907 is enabled to gate data from Ia register 903, real multiplier selector 908 is enabled to select register Ib register 904, imaginary multiplier selector 909 is enabled to select Ib register 904, and imaginary multiplier selector 910 is enabled to select I$\alpha$ register 903. The four multiplier selectors gate data from the I registers to the real and imaginary multiply networks 911 and 912 respectively. Each multiply network generates two 36-bit partial products of the two operands, the sum of these two partial products being the true product. The partial products are then stored in holding registers. For real multiply network 911, these holding registers are partial sum register 913 and partial carry register 915. Partial sum register 914 and partial carry register 916 hold the partial products from imaginary multiply network 912. After the partial products have been computed, they are summed simultaneously by real adder 923 in the case of the real product and imaginary adder 924 in the case of the imaginary product. This is accomplished by simultaneously enabling all four arithmetic selectors to gate all four partial products to their respective adders. After this addition has occurred, real product register 925 holds the true product of the absolute values held in Ia register 903 and Ib register 904. Simultaneously imaginary adder 924 generates the absolute magnitude product of the values held in Ib register 904 and I$\alpha$ register 905 and stores this product in imaginary product register 926. Then real arithmetic selector 919 selects either the positive output of real product register 925 or the inverted output of the same register from 60-bit inverter 917, depending on the original signs of the multiplier and multiplicand as transmitted to catching register 1 output selector 902. Real arithmetic selector 920 selects the output of SOPR register 110. Real adder 923 forms the sum of the current quantity in SOPR register 110 and the true (signed) arithmetic product of the multiplier and the multiplicand as they are stored in memory. The sum is gated to real product register 925 and from it to SOPR register 110. Simultaneously the present contents of imaginary product register 926 is summed with the present contents of SOPI register 111. The sign of the value in imaginary product register 926 is corrected as for the real sum, by sign control 934.

To complete computation of the real coefficient of the product, real multiplier selector 907 and real multiplier selector 908 gate data from Iα register 905 and Iβ register 906 respectively to real multiply network 911. As for the product of the two real coefficients just computed, operation is similar until the product of the two imaginary coefficients is held by real product register 925. At this point a divergence from the product of the real coefficients is necessary. Referring back to equation (ii), the product of the imaginary coefficients must be subtracted from the product of the real coefficients when multiplying two complex numbers because the product of (i)(i)= −1. Sign control 934 again signals real arithmetic selector 0, 919, to select the uncomplemented or complemented contents of real product register 925. If, however, only one of the imaginary coefficients as stored in memory 103 is negative, the positive contents of real product register 925 is added to the current contents of SOPR register 110. If the two imaginary coefficients are both or neither positive, the complement of the contents of real product register 925 will be added to SOPR register 110. This corresponds to subtraction of the product. The imaginary product is formed from the contents of Ia register 903 and Iβ register 906. With the exception of a different multiplier and multiplicand, computation of the second imaginary product is exactly as the first. And similarly, computation of the second imaginary product proceeds simultaneously with computation of the second real product. At the completion of the two second products another four coefficients are read from memory through arithmetic transmitter 312 to catching register 902. (See TABLE V and accompanying discussion.) From catching register 902, these coefficients are routed to their respective I registers and four products are generated and added or subtracted to their respective sum of products registers.

After each set of sums of products have been computed, the loop count is decremented. When current loop count register 505 contents reach 0, computation of products is momentarily halted. The value contained by SOPR register 110 is selected by catching register 2 selector 929 and gated to catching register 930. Catching register 930 transmits the 60-bit sum of products to arithmetic shift network 931. Arithmetic shift register 931 adds 12 sign bits to this 60-bit sum and shifts this 72-bit number the number of bits specified by the contents of shift count register 510, shown in FIG. 5. Byte select register 932 received bits 4 through 9 from the arithmetic instruction while it was in ZA register 405. If bit 5 of byte select register 932 (bit 9 of the arithmetic instruction being executed) is set the high order 12 bits of the output of arithmetic shift network 931 are gated to I/O selector 802 and sent to memory 103 or data channel 101. Lower order bits of byte select register 932 are then examined and successively lower order 12-bit bytes from arithmetic shift network 931 are transmitted to I/O selector 802. Unload overflow detector 933 examines the byte selections made to determine if the highest order significant bit in the arithmetic shift network output is contained within a selected byte. If not, the overflow count register 513 is decremented by 1. If the overflow count before decrementing is 0, the arithmetic instruction in progress will abort and the next instruction will be executed. Whenever unload overflow is detected, the numeric value contained in the bytes selected is changed to the value of the largest magnitude positive number which the selected bytes are capable of containing if the sign bit in arithmetic shift network 931 is 0 and is changed to the largest magnitude negative value which the selected bytes are capable of containing if the sign bit is 1. This operation (which is called clipping) is utilized to preserve a result which will be as accurate as possible under overflow conditions.

When the contents of the SOP registers 110 and 111 have been unloaded the pass count register 507 contents are decremented by 1. If not 0 before decrementing, the contents of the address registers are incremented as described in Table V at $T_1$+5 through $T_1$+8 and director bit d1 is tested. If 0, SOPR and SOPI registers 110 and 111 are cleared. Then a new series of complex products using the operands in the new addresses are computed and summed. This iteration continues until pass count register 507 contents are 0 before its decrement. The final sums are unloaded and the instruction is terminated at that time.

The embodiment described is the best currently devised. In such complicated apparatus infinite variants are possible. Not wanting to be limited by the foregoing description in the scope of my invention, but only by the claims following.

What I claim is:

1. Apparatus for computing a term of a generalized complex convolution of a plurality of vectors having elements comprising complex numeric terms, each element being stored in a memory having at least two matrix storage areas and issuring the values of the coefficients of a complex numeric term encoded in a data signal responsive to a term identification signal specifying the matrix containing the term and the position of the term in the matrix, comprising:

a. at least one address parameter storage means;

b. term selecting means having an input terminal receiving retrieve signals, for choosing a plurality of terms from each matrix responsive to the contents of the address parameter storage means and transmitting term identification signals to the memory causing issuance of data signals encoding the first and succeeding terms from each chosen plurality of terms responsive respectively to first and succeeding retreive signals;

c. computing means having an input terminal receiving the data signals, for transmitting retrieve signals to the term selecting means, computing the complex product of the complex terms encoded in each group of data signals issued responsive to each retrieve signal and forming the complex sum of the complex products; and d. means for varying the contents of the address parameter storage means in a manner dependent on an external signal.

2. The apparatus of claim 1 wherein the address parameter storage means further comprises:

a. an address register for storing an address number specifying the position of a complex term in its matrix, b. means for setting the address register to the address specifying the first term chosen in the associated matrix response to the external signal, and c. incrementing means for varying the contents of the address register responsive to each retrieve signal.

3. The apparatus of claim 2 wherein the address register comprises a plurality of binary flip-flops, and wherein said apparatus further comprises means for shifting the contents of the flip-flops a predetermined number of positions.

4. The apparatus of claim 2 wherein the incrementing means includes storage means for holding an address increment and means for modifying the contents of the address register by the address increment.

5. The apparatus of claim 4 including means responsive to the external signal for varying the contents of the address increment storage means.

6. The apparatus of claim 1 including means for storing the sum of the complex products externally to the apparatus.

7. The apparatus of claim 1 including means for storing the sum of the complex products in the memory.

8. The apparatus of claim 1 wherein the computing means includes a plurality of multiplier elements concurrently operable for overlapping timewise the computation of products of the complex term coefficients.

9. Apparatus for computing a generalized complex convolution of a plurality of vectors having elements comprising complex numeric terms, each element being stored in a memory having at least two matrix storage areas and issuing the values of the coefficients of a complex numeric term encoded in a data signal responsive to a term identification signal specifying the matrix containing the term and the position of the term in the matrix comprising:

a. at least one address parameter storage means;

b. term selecting means having a plurality of input terminals receiving select signals and retrieve signals for choosing, responsive to each select signal and the contents of the address parameter storage means, a plurality of terms from each matrix, and transmitting term identification signals to the memory causing issuance of data signals encoding the first and succeeding terms from each chosen plurality of terms responsive respectively to first and succeeding retrieve signals;

c. computing means having a plurality of input terminals receiving select signals and data signals for supplying a plurality of retrieve signals to the term selecting means responsive to each select signal, receiving the group of complex terms issued responsive to each retrieve signal, computing the complex product of the terms so issued, forming the complex sum of the complex products respectively, and storing the coefficients of the complex sum;

d. means for varying the contents of the address parameter storage means in a manner dependent on an external signal; and e. control means for transmitting to the term selecting means the computing means at least one select signal.

10. The apparatus of claim 9 wherein the address parameter storage means further comprises:

a. a start address register;

b. means for setting the start address register to a number specifying the matrix position of the first complex numeric term chosen responsive to the first select signal, and c. incrementing means for varying the contents of the start address register responsive to each select signal.

11. The apparatus of claim 9 wherein the control means includes means for causing the computing of a plurality of complex numeric values $S_j$, each $S_j$ comprising the sum of the first through j th complex sums computed; and means for causing the control means to issue first through $j$ th select signals.

12. The apparatus of claim 9 wherein the address parameter storage means further comprises:

a. a current address register containing an integer specifying the position of a term in a matrix and issuing a term identification signal for that term responsive to a retrieve signal;

b. a current address increment storage means containing an integer, for specifying the number of complex terms between successive complex terms chosen from the matrix; and c. incrementing means receiving retrieve signals for increasing the integer contained in the current address register by the integer contained in the current address increment storage means responsive to a retrieve signal.

13. The apparatus of claim 9 wherein the control means includes testing means for testing the sign of a previously computed sum and changing the contents of the address parameter storage means dependent on the sign.

14. Apparatus for computing a generalized real convolution of a plurality of vectors having elements comprising real numeric terms, the value of each element being stored in a memory having at least two matrix storage areas and issuing a data signal in which is encoded the value of a real term responsive to a term identification signal specifying the matrix containing the term and the position of the term in the matrix, comprising:

a. integer storage means for storing the values of first and second preselected integers for each matrix and a variable integer for each matrix;

b. term selecting means receiving retrieve and select signals for incrementing the variable integers for each matrix by the value of the first preselected integer for that matrix responsive to a retrieve signal, incrementing the variable integer for each matrix by the value of the second preselected integer for that matrix responsive to a select signal and emitting, responsive to a retrieve signal, term identification signals specifying the term in each matrix occupying the position specified by its respective variable integer;

c. computing means having an input terminal receiving the data signals and select signals for transmitting a plurality of retrieve signals to the term selecting means responsive to each select signal, computing the products of the terms encoded in data signals issued by the memory after each retrieve signal and forming the sum of the products formed from the data signals issued responsive to each select signal; and d. control means for transmitting to the term selecting means and the computing means at least one select signal.

15. The apparatus of claim 14 wherein the control means includes presetting means for presetting the variable integers prior to emission of the first select signal.

16. The apparatus of claim 14 wherein the control means includes testing means for testing the sign of a previously computed sum and changing the contents of the integer storage means in a manner dependent on the sign.

17. Apparatus for computing a generalized complex convolution of a plurality of vectors having elements comprising complex numeric terms, each element being stored in a memory having at least two matrix storage areas and issuing the value of a complex term encoded in a data signal responsive to a term identification signal specifying the matrix containing the term and the position of the term in the matrix, comprising:

a. integer storage means for storing the values of first and second preselected integers for each matrix and a variable integer for each matrix;

b. term selecting means receiving retrieve and select signals, for incrementing the variable integer for each matrix by the value of the first preselected integer for each matrix responsive to a retrieve signal, incrementing the variable integer for each matrix by the value of the second preselected integer for that matrix responsive to a select signal and issuing responsive to a retrieve signal, term identification signals specifying the term in each matrix occupying the position specified by its respective variable integer;

c. computing means having an input terminal receiving the data signals and select signals, for transmitting a plurality of retrieve signals to the term selecting means responsive to each select signal, computing the product of the terms encoded in data signals emitted by the memory after each retrieve signal, and forming the complex sum of the products formed from the data signals emitted responsive to each select signal; and d. control means for transmitting to the term selecting means and the computing means at least one select signal.

18. The apparatus of claim 17 wherein the control means includes presetting means for presetting the variable integers prior to emission of the first select signal.

19. Apparatus for computing an equation comprising:

a. control signal means for supplying data address control signals encoding preselected integers $k$, $P$, $Q$, $U$, and $V$, and a preselected loop count signal LC;

b. data signal means for encoding first and second ordered pluralities of data signals $\overline{A}_0$ through $\overline{A}_m$ and $\overline{B}_0$ through $\overline{B}_n$ wherein each $\overline{A}$ and $\overline{B}$ comprises a complex number of the form $x + y\sqrt{-1}$;

c. memory means receiving the signals supplied by the control signal means and the data signal means, for storing each signal and supplying each signal responsive to a retrieve signal designating the stored signal; and d. an arithmetic unit sequentially supplying a plurality of retrieve signals to the memory means and providing responsive to the retrieved signals from the memory means, an output signal encoding a complex number $\overline{C}_k$ of the form $x + y\sqrt{-1}$ computed according to the equation $$\overline{C}_k = \sum_{j=0}^{LC-1} (\overline{A}_{Pj+Qk}) \cdot (\overline{B}_{Uj+Vk})$$

20. Apparatus for computing equation comprising:

a. control signal means for supplying data address control signals encoding preselected integers $k$, $P$, $Q$, $U$, and $V$, and a preselected loop count signal LC;

b. data signal means for encoding first and second ordered pluralities of data signals $a_0$ through $a_m$ and $b_0$ through $b_n$ wherein each $a$ and $b$ comprises a real number;

c. memory means receiving the signals supplied by the control signal means and the data signal means, for storing each signal and supplying each signal responsive to a retrieve signal designating the stored signal; and d. an arithmetic unit sequentially supplying a plurality of retrieve signals to the memory means and providing responsive to the retrieved signals from the memory means, an output signal encoding a real number $C_k$ computed according to the equation:

$$C_k = \sum_{j=0}^{LC-1} (a_{Pj+QK}) \cdot (b_{Uj+Vk})$$

21. Apparatus for computing an equation comprising:

a. control signal means for supplying data address control signals encoding preselected integers $k$, $P$, $Q$, $U$, and $V$, and a preselected loop count signal LC;

b. data signal means for encoding first and second ordered pluralities of data signals $a_0$ through $a_m$ and $b_0$ through $b_n$ wherein each $a$ and $b$ comprises a real number;

c. memory means receiving the signals supplied by the control signal means and the data signal means, for storing each signal and supplying each signal responsive to a retrieve signal designating the stored signal; and d. an arithmetic unit sequentially supplying a plurality of retrieve signals to the memory means and providing responsive to the retrieved signals from the memory means, an output signal encoding a real number $C_k$ computed according to the equation:

$$C_k \sum_{j=0}^{LC=1} (a_{Pj+Qk}) \cdot (b_j)$$

* * * * *